(12) United States Patent
Hijikata et al.

(10) Patent No.: US 7,864,034 B2
(45) Date of Patent: Jan. 4, 2011

(54) DRIVER ASSISTING SYSTEM FOR VEHICLE AND VEHICLE EQUIPPED WITH THE DRIVER ASSISTING SYSTEM

(75) Inventors: Shunsuke Hijikata, Kamakura (JP); Masahiro Egami, Yokosuka (JP); Norio Kosaka, Fujisawa (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 0 days.

(21) Appl. No.: 12/612,597

(22) Filed: Nov. 4, 2009

(65) Prior Publication Data

US 2010/0049407 A1    Feb. 25, 2010

Related U.S. Application Data

(63) Continuation of application No. 11/146,081, filed on Jun. 7, 2005, now Pat. No. 7,636,034.

(30) Foreign Application Priority Data

Jun. 9, 2004    (JP) .............................. 2004-170942
Oct. 22, 2004    (JP) .............................. 2004-307820

(51) Int. Cl.
  *B60Q 1/00*    (2006.01)
(52) U.S. Cl. ...................... 340/438; 340/437; 701/300
(58) Field of Classification Search ................. 340/466,
  340/438, 436, 437, 440, 901; 701/300, 301
  See application file for complete search history.

(56) References Cited

U.S. PATENT DOCUMENTS

2002/0145512 A1* 10/2002 Sleichter et al. .......... 340/407.1
2003/0229447 A1* 12/2003 Wheatley et al. ............ 701/300
2004/0178893 A1*  9/2004 Litkouhi et al. ............. 340/435

* cited by examiner

*Primary Examiner*—George A Bugg
*Assistant Examiner*—Kerri McNally
(74) *Attorney, Agent, or Firm*—McDermott Will & Emery LLP

(57) ABSTRACT

A system assists a driver occupying a seat within a vehicle traveling on a road. The system includes sensing apparatus that senses a plurality of different types of conditions regarding the vehicle. Information apparatus provides information regarding the different types of conditions to the driver by respective different types of haptic inputs.

16 Claims, 31 Drawing Sheets

DRIVER ASSISTING SYSTEM FOR VEHICLE AND VEHICLE EQUIPPED WITH THE DRIVER ASSISTING SYSTEM

CROSS-REFERENCE TO RELATED APPLICATIONS

The present application is a continuation of and claims priority benefit under 35 U.S.C. §120 from U.S. patent application Ser. No. 11/146,081, filed Jun. 7, 2005, which claims the benefit of priority from Japanese Patent Application No. 2004-170942, filed Jun. 9, 2004 and also claims the benefit of priority from Japanese Patent Application No. 2004-307820, filed Oct. 22, 2004, the disclosure of each of which is hereby incorporated by reference in its entirety.

BACKGROUND OF THE INVENTION

1. Field of the Invention

The present invention relates to a system for assisting a driver occupying a seat within a vehicle traveling on a road.

2. Description of Related Art

JP-A 2001-199296 discloses a driver's seat including vibrators on the right and left of a head rest, a back portion, and a seat portion. An obstacle around a vehicle approaching the vehicle is detected and determined whether a risk is high. If it is determined that the approaching obstacle has a high risk, this information is transmitted to the driver by exciting at least one vibrator indicating a direction toward the approaching obstacle.

In the commonly assigned U.S. patent application Ser. No. 11/047,577, which claims the priority derived from Japanese Patent Application No. 2004-032465 filed Feb. 9, 2004 and U.S. patent application Ser. No. 11/052,812, which claims the priority derived from Japanese Patent Application No. 2004-032466 filed Feb. 9, 2004, the assignee has proposed a driver assisting system that transmits an in-lane lateral position by haptic inputs via different portions of a driver's seat. According to the proposed system, a pressure input is applied to the driver by selectively activating actuators, which are arranged to modify, in contour, different portions of the driver's seat.

The proposed driver assisting systems are satisfactory to some extent. However, a need remains for transmitting a plurality of different pieces of information to the driver other than the in-lane lateral position.

SUMMARY OF THE INVENTION

Various embodiments of driving assisting systems and methods are described. An exemplary system for assisting a driver occupying a seat within a vehicle traveling on a road includes sensing apparatus that senses a plurality of different types of conditions regarding the vehicle, and information apparatus that provides information regarding the different types of conditions to the driver by respective different types of haptic inputs. In certain aspects, the different conditions include longitudinal and lateral conditions with respect to the vehicle. The lateral condition comprises a lateral position of the vehicle within a lane on the road, in certain aspects, while the longitudinal condition comprises the speed of the vehicle.

According to certain embodiments the information apparatus creates the different types of haptic inputs based on the lateral and longitudinal information and applies the different types of haptic inputs to the driver via the seat to provide the driver a perception of a running environment of the vehicle.

In certain embodiments, the information apparatus provides the information regarding the lateral position of the vehicle and the vehicle speed to the driver by different respective pressure inputs via different respective portions of the seat. According to certain aspects of the invention, the information apparatus modifies the pressure input provided to the driver regarding the lateral position of the vehicle based on the vehicle speed. In certain other aspects, the information apparatus provides the information regarding the vehicle speed to the driver by altering the respective portion of the seat to apply the respective pressure input to the driver.

According to certain embodiments of the invention, the information apparatus provides the information regarding the lateral position of the vehicle and the vehicle speed to the driver by different respective pressure inputs via the same portion of the seat. The information apparatus restricts providing the information regarding the lateral position of the vehicle to the driver when the vehicle is traveling within a predetermined region around a centerline of the lane and the vehicle speed is less than a predetermined value.

In certain aspects of the invention, the longitudinal condition comprises a risk potential with regard to a preceding vehicle. According to certain embodiments, the information apparatus creates the haptic inputs based on the lateral and longitudinal information and applies the haptic inputs to the driver via the seat to provide the driver a perception of a running environment of the vehicle. In accordance with certain embodiments, the information apparatus provides the information regarding the risk potential and the lateral position of the vehicle to the driver by respective different haptic inputs of different magnitudes via the same portion of the seat. According to other embodiments, the information apparatus provides the information regarding the risk potential and the lateral position of the vehicle to the driver by respective different forms of haptic inputs via the same portion of the seat. According to still other embodiments, the information apparatus provides the information regarding the risk potential and the lateral position of the vehicle to the driver by different pressure inputs via different portions of the seat. In still other embodiments, the information apparatus provides the information regarding the risk potential and the lateral position of the vehicle to the driver by respective different forms of haptic inputs via different portions of the seat.

In certain embodiments, the information apparatus provides the information regarding the risk potential and the lateral position of the vehicle to the driver by different pressure inputs via the seat and by a reaction force input via an accelerator pedal of the vehicle.

The lateral condition, in certain embodiments, further comprises an obstacle located laterally of the vehicle, wherein the information apparatus provides a lateral risk potential with regard to the obstacle and the lateral position of the vehicle within the lane, the information apparatus providing the risk potential with regard to the preceding vehicle and the lateral position of the vehicle to the driver by pressure inputs via different respective pressure inputs via different portions of the seat, and the lateral risk potential to the driver and the lateral position of the vehicle by different haptic inputs via the same portion of the seat.

According to one embodiment, a method is provided for assisting a driver occupying a seat within a vehicle traveling on a road, the method comprising sensing a plurality of different types of conditions regarding the vehicle, and providing information regarding the different types of conditions to the driver by respective different types of haptic inputs. In certain aspects, the different types of conditions include longitudinal and lateral information with respect to the vehicle, and the longitudinal and lateral information are provided to the driver by respective different types of haptic inputs.

Certain embodiments provide a system for assisting a driver occupying a seat within a vehicle traveling on a road, and included means for sensing a plurality of different types of conditions regarding the vehicle, and means for providing information regarding the different types of conditions to the driver by respective different types of haptic inputs.

Still further embodiments provide a vehicle, comprising a system for assisting a driver occupying a seat within a vehicle traveling on a road, the system including sensing apparatus that senses a plurality of different types of conditions regarding the vehicle, and information apparatus that provides information regarding the different types of conditions to the driver by respective different types of haptic inputs.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout.

DETAILED DESCRIPTION OF THE INVENTION

First Exemplary Embodiment

Figure 1:
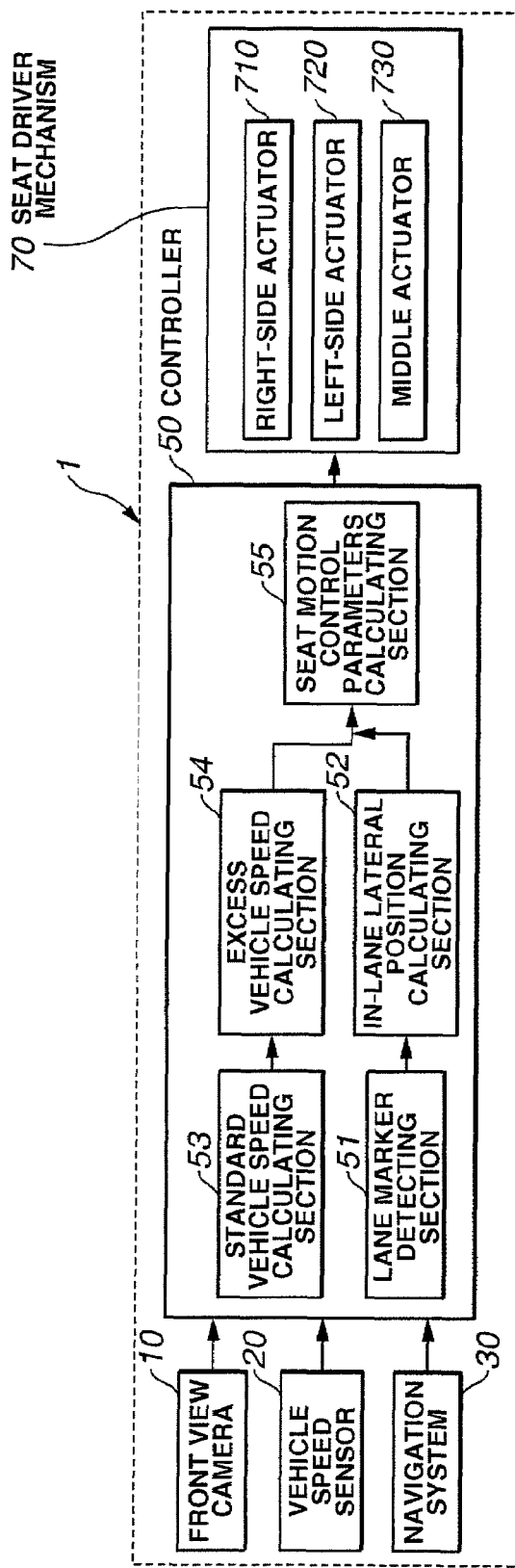
FIG. 1 is a block diagram illustrating a first exemplary embodiment of a driver assisting system according to the present invention.
Figure 2:
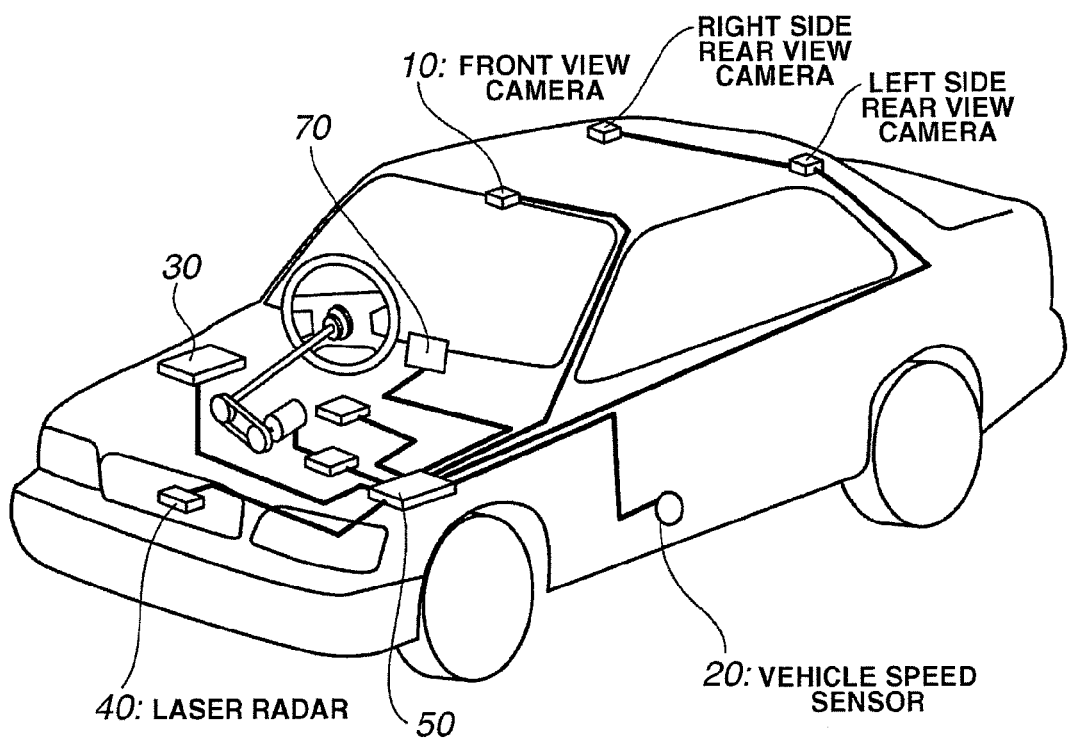
FIG. 2 is a perspective view of a vehicle in the form of an automotive vehicle installed with the driver assisting system.

Referring to FIGS. 1 to 8 of the accompanying drawings, the first exemplary embodiment of a driver assisting system is described below. The block diagram in FIG. 1 illustrates the first exemplary embodiment of a driver assisting system 1. The perspective view in FIG. 2 illustrates a vehicle in the form of an automotive vehicle installed with the driver assisting system 1.

The driver assisting system 1 includes a front view camera or a front camera 10, a vehicle speed sensor 20, a navigation system 30, a controller 50, and a seat driver mechanism 70.

The front camera 20 is of the CCD type or CMOS type. The front camera 10 may be mounted to the vehicle in the vicinity of an internal rear view mirror to pick up an image of a road ahead of the vehicle. The front camera 10 provides the image to the controller 50. The region covered by the front camera 10 extends from the camera axis to each side by 30 degrees. The image picked up by the front camera 10 is received by the controller 50.

The vehicle speed sensor 20 may detect a vehicle speed of the vehicle by measuring a revolution speed of a road wheel or an output element of a transmission, and provides the detected vehicle speed to the controller 50.

The navigation system 30 detects a current position of the vehicle via a GPS receiver. Using the current position and map or road information stored in a database provides information regarding a road, on which the vehicle is traveling, to the controller 50.

The controller 50 may comprise a central processing unit (CPU), a read only memory (ROM), a random access memory (RAM), and CPU peripheral devices. In the exemplary embodiment, the controller 50 includes, in software implementation, a lane marker detecting section 51, an in-lane lateral position calculating section 52, a standard vehicle speed calculating section 53, an excess vehicle speed calculating section 54, and a seat motion control parameters calculating section 55.

The lane marker detecting section 51 processes images, picked up by the front camera 10, of a road ahead of the vehicle to detect lane boundaries (lane markers) defining the lane the vehicle is traveling. The in-lane lateral position calculating section 52 calculates an in-lane lateral position of the vehicle within the lane based on signals from the lane marker detecting section 51.

The standard vehicle speed calculating section 53 calculates a standard vehicle speed for the road the vehicle is traveling on based on information from the navigation system 30. Accounting for a vehicle speed limit set for the road, the road curvature, an error in the vehicle speed sensor 20, and fuel economy determine a recommended vehicle speed as the standard vehicle speed. The excess vehicle speed calculating section 54 calculates an excess, in amount, by which the current vehicle speed detected by the vehicle speed sensor 20 exceeds the standard vehicle speed calculated by the standard vehicle speed calculating section 53.

The seat motion control parameters calculating section 55 calculates the control parameters applied to the seat driver mechanism 70 based on the in-lane lateral position calculated by the in-lane lateral position calculating section 52 and the excess vehicle speed calculated by the excess vehicle speed calculating section 54. Specifically, control parameters to a right-side actuator 710, a left-side actuator 720 and a middle actuator 730 are calculated. The controller 50 provides the control parameters calculated by the seat motion control parameters calculating section 55 to the seat driver mechanism 70. The controller 50 regulates haptic pressure inputs via a plurality of various portions of a seat to transmit information regarding a degree of approach to lane markers and the vehicle speed.

Figure 3:
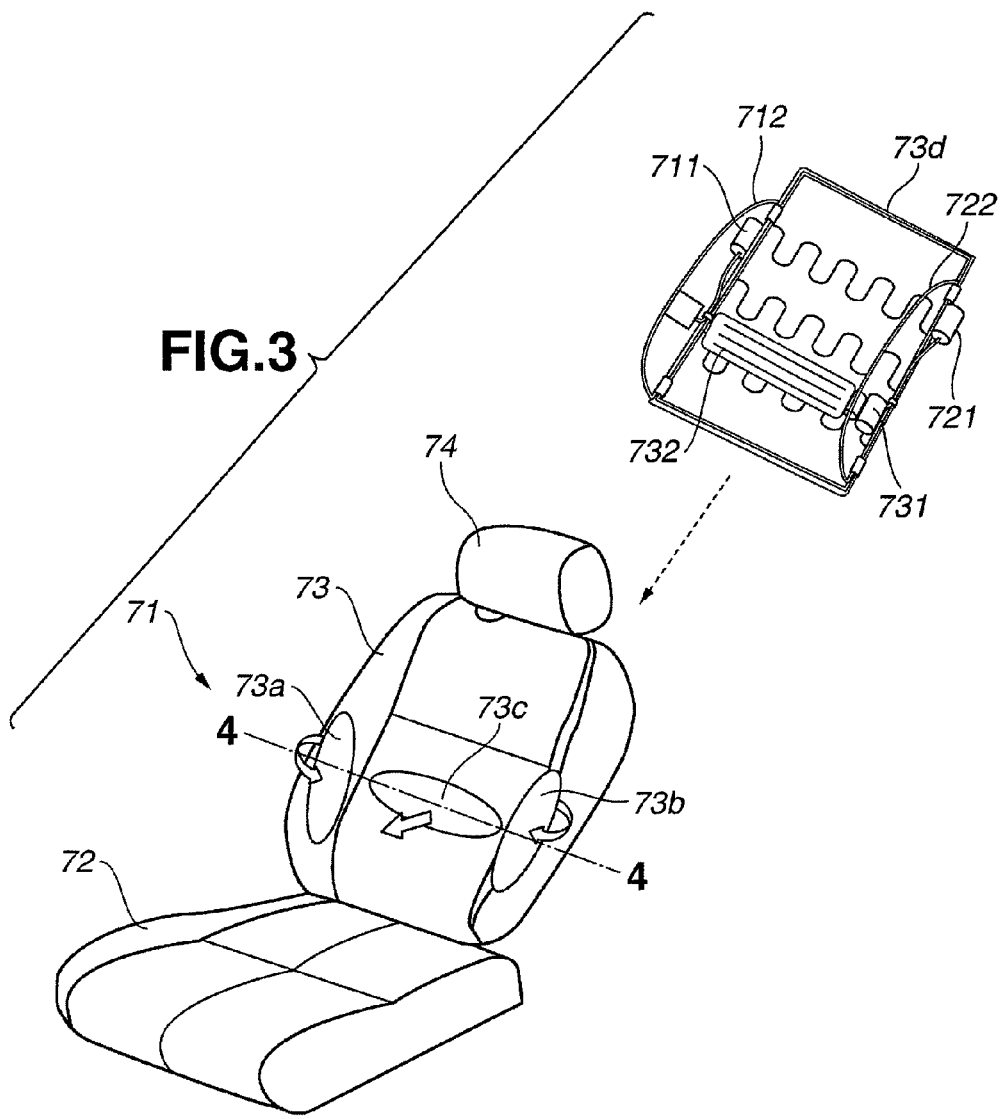
FIG. 3 is an exploded view of a driver seat mounted to the vehicle shown in FIG. 2 with the seat driver mechanism removed.
Figure 4:
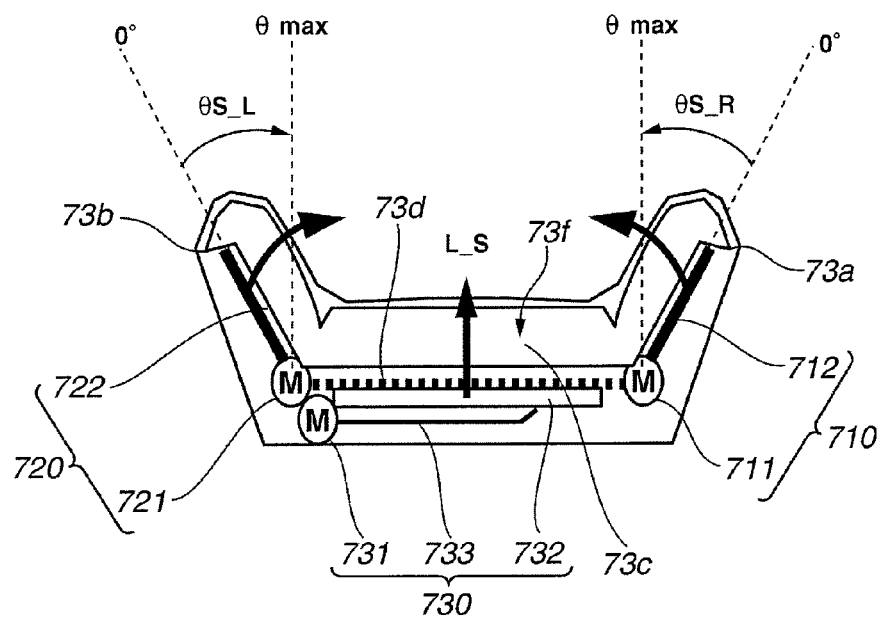
FIG. 4 is a cross sectional view taken through the line 4-4 in FIG. 3.

Under commands of the controller 50, the seat driver mechanism 70 activates the plurality of various portions of the seat independently in such a manner as to regulate the haptic pressure inputs via the plurality of seat portions to transmit the information regarding the degree of approach to the lane markers and the vehicle speed. FIGS. 3 and 4 show a driver seat 71 mounted to the vehicle, shown in FIG. 2, equipped with the driver assisting system 1 and activated by the seat driver mechanism 70.

Referring to FIGS. 3 and 4, the seat 71 is composed of, as usual, a cushion 72, a back rest 73 and a head rest 74. In the first exemplary embodiment, the seat driver mechanism 70 swings a right side portion 73a, a left side portion 73b and a middle portion 73c of the back rest 73 to produce haptic pressure inputs to the driver. The seat driver mechanism 70 will be described in detail below.

The right-side actuator 710, left-side actuator 720 and middle actuator 730 of the seat driver mechanism 70 are best seen in FIG. 4. The right-side actuator 710 is provided to swing the right side portion 73a of the back rest 73. The left-side actuator 720 is provided to swing the left side portion 73b of the back rest 73. The middle actuator 730 is provided to activate a middle portion of the back rest 73. These actuators 710, 720 and 730 are embedded in the back rest 73.

FIG. 4 is a cross sectional view through the line 4-4 in FIG. 3. As shown in FIG. 4, the right-side actuator 710 includes a motor 711 provided at a right side end of a seat back frame 73d and a side frame 712 driven by the motor 711. The left-side actuator 720 includes a motor 721 provided at a left side end of the seat back frame 73d and a side frame 722 driven by the motor 721. The middle actuator 730 includes a motor 731 attached to the seat back frame 73d and a seat back plate 732 driven by the motor 731 via an arm 733.

Rotation of the motor 711 of the right-side actuator 710 causes the side frame 712 to swing in a direction indicated by the illustrated arrow, that is, in a direction inwardly of the back rest 73, thus pressing a portion of a urethane pad 73f against a right-hand side of the driver. Rotation of the motor 721 of the left-side actuator 720 causes the side frame 722 to swing in a direction indicated by the illustrated arrow, that is, in a direction inwardly of the back rest 73, thus pressing a portion of the urethane pad 73f against a left-hand side of the driver. Rotation of the motor 731 of the middle actuator 730 causes the seat back plate 732 to move in a longitudinal direction, with respect to the vehicle, via the arm 733 into pressed contact with a waist (a lumbar) of the driver. The middle actuator 730 may take the form of a conventional lumbar support.

Figure 5:
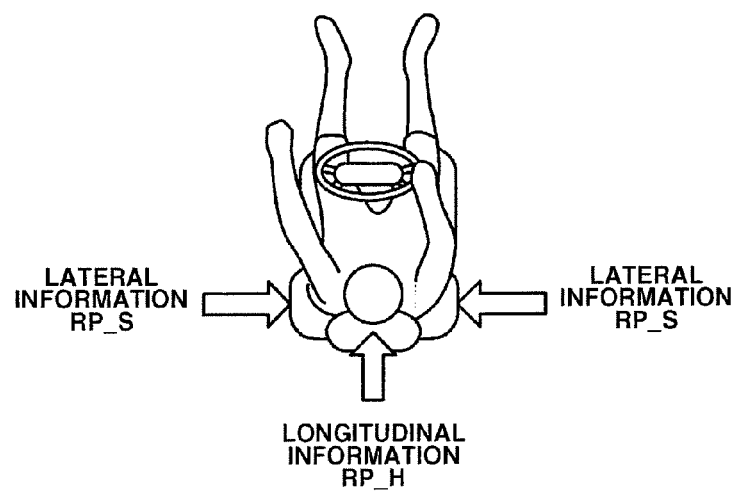
FIG. 5 is a diagram illustrating pieces of information to be transmitted to a driver via a driver's seat.

The first exemplary embodiment of driver assisting system 1 operates as follows:

In the driver assisting system 1, a plurality of pieces of information necessary for the vehicle to travel are clearly transmitted to the driver by pressure inputs (haptic information inputs) via the seat 71. Referring to FIG. 5, the plurality of pieces of information are divided into information necessary for longitudinal control of the vehicle (labeled "longitudinal information") and information necessary for lateral control of the vehicle (labeled "lateral information"). Based on the longitudinal information and lateral information, the seat 71 is activated at respective portions individually. Specifically, the lateral information represents a degree of approach to lane markers. The right and left side portions 73a and 73b of the back rest 73 are selectively activated in response to a degree of approach to the adjacent lane marker. The longitudinal information represents an excess vehicle speed of the vehicle. Based on the excess vehicle speed, the middle portion 73c of the back rest 73 is activated.

The right-side and left-side actuators 710 and 720 press the respective right and left side portions 73a and 73b against the driver to give pressure inputs to the driver from the right and left of the seat 71, thereby to transmit information on a degree of approach to the adjacent lane marker to the driver. The middle actuator 730 presses the middle portion 73c against the driver to give pressure inputs from the front and rear of the seat 71, thereby to transmit information on an excess vehicle speed to the driver.

Figure 6:
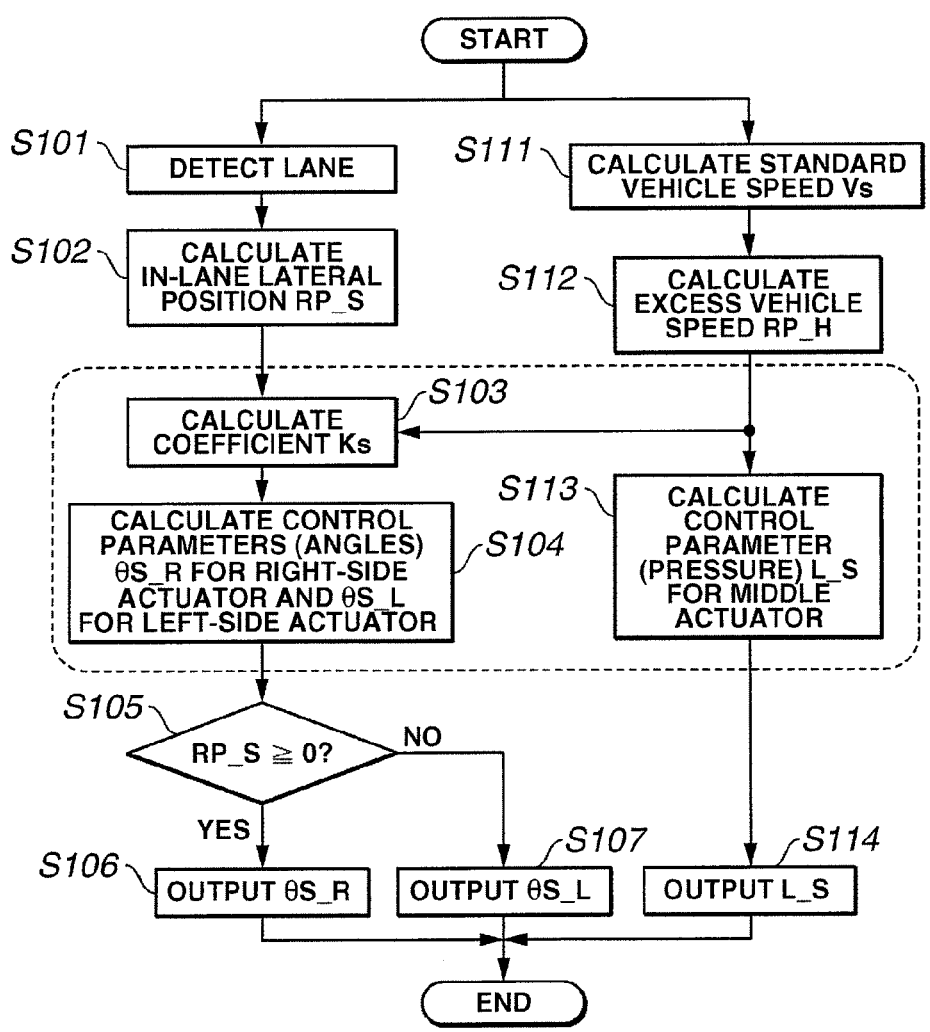
FIG. 6 is a flow chart illustrating the operation of the first exemplary embodiment.

Referring to FIG. 6, it is described how the driver assisting system 1 according to the first exemplary embodiment operates. The flow chart in FIG. 6 illustrates a control program for assisting a driver of the vehicle. Execution of the control program is repeated at regular intervals of 50 milliseconds.

In FIG. 6, at step S101, the controller 50 detects a lane which the vehicle is traveling on at the lane marker detecting section 51. Specifically, it recognizes lane markers defining the lane via image processing of the image picked up by the front camera 10.

Figure 7:
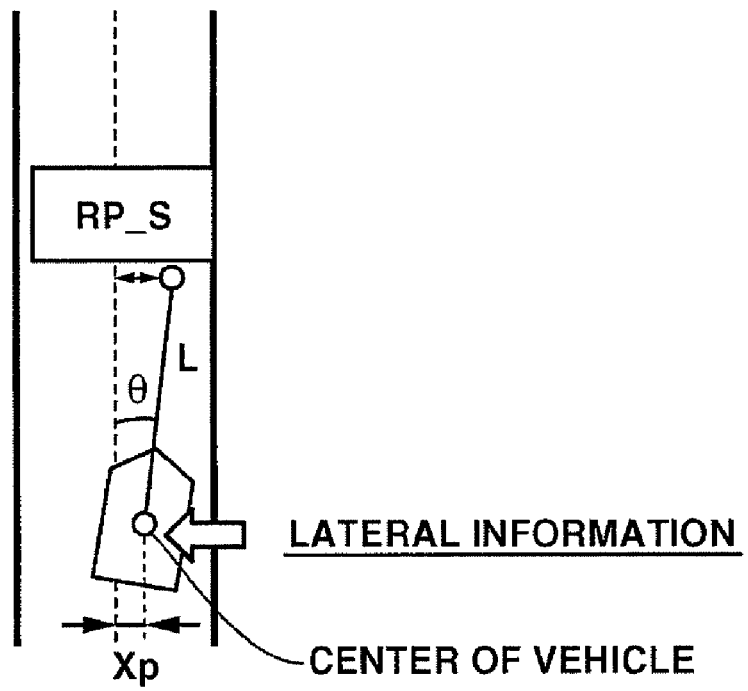
FIG. 7 is a diagram illustrating how to calculate an in-lane lateral position of a vehicle.

At step S102, the controller 50 calculates a relative positional relationship of the host vehicle to the recognized lane markers. Specifically, it calculates an in-lane lateral position RP_S based on the processed image. In this embodiment, as shown in FIG. 7, the in-lane lateral position RP_S is a lateral position from a contrived centerline of the lane to a measurement point in front of and spaced a distance L from the host vehicle. This point is on an extension of a longitudinal line passing through a center of the host vehicle. The in-lane lateral position RP_S may be expressed as:

$$RP\_S = L \cdot \sin\theta + Xp \qquad \text{(Eq. 1)}$$

where: $\theta$ is a yaw angle of the host vehicle;
Xp is a lateral distance of the center of the host vehicle from the contrived centerline of the lane.

The in-lane lateral position RP_S is zero when the measurement point is on the centerline of the lane, takes positive values in a direction toward the right away from the centerline, and takes negative values in the opposite direction to the left away from the centerline.

At step S111, the controller 50 calculates a standard vehicle speed Vs for the road which the vehicle is traveling on at the standard vehicle speed calculating section 53. Specifically, it calculates the standard vehicle speed Vs from such information provided by the navigation system 30 as a current position of the host vehicle and road information on the road on which the host vehicle is traveling.

At step S112, the controller 50 calculates an excess vehicle speed RP_H at the excess vehicle speed calculating section 54. Specifically, it calculates the excess vehicle speed RP_S by subtracting the vehicle speed V detected by the vehicle speed sensor 20 from the standard vehicle speed Vs calculated at step S111 (RP_H=V−Vs, RP_H≧0).

At the next step S113, the controller 50 calculates, at the seat motion control parameters calculating section 55, a control parameter L_S for the middle actuator 730 arranged to activate the middle portion 73c of the back rest 73. The control parameter L_S represents an amount by which the seat back plate 732 is pressed against the back of the middle portion 73c and may be expressed as;

$$L\_S = Kh \cdot RP\_H \qquad \text{(Eq. 2)}$$

Figure 8:
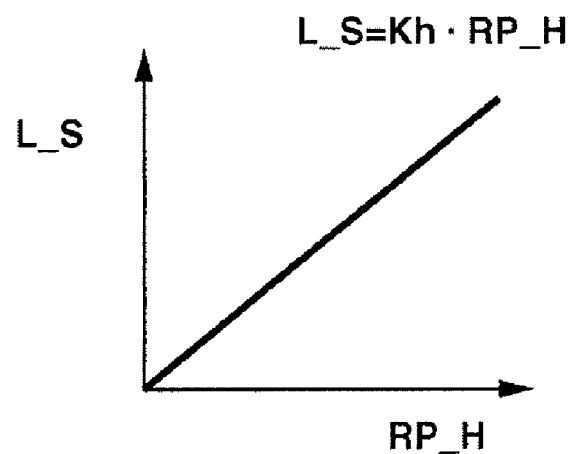
FIG. 8 is a graphic representation of varying of a control parameter L_S with different values of an excess vehicle speed RP_H.

In the equation Eq. 2, Kh is a coefficient used to convert the excess vehicle speed RP_H to the control parameter L_S. An appropriate value is predetermined and set as the coefficient Kh. The fully drawn line in FIG. 8 illustrates varying of the control parameter L_S with different values of the excess vehicle speed RP_H. As shown in FIG. 8, the control parameter L_S increases as the excess vehicle speed Vs increases. Thus, the more the vehicle speed V exceeds the standard vehicle speed Vs, the more is the amount by which the seat back plate 732 presses the middle portion 73c of the back rest 73. Thus, the seat back plate 732 applies to a lumbar portion of the driver an increasing pressure input with increasing values of the excess vehicle speed RP_H.

At step S103, the controller 50 calculates, at the control parameters calculating section 55, a coefficient Ks that is used to calculate control parameters $\theta S\_R$ and $\theta S\_L$ for the right- and left-side actuators 710 and 720, respectively. Using the excess vehicle speed RP_H, the coefficient Ks may be expressed as:

$$Ks = (1 + Kh2 \cdot RP\_H) \qquad \text{(Eq. 3)}$$

In the equation Eq. 3, Kh2 is constant. This equation clearly shows that the coefficient Ks increases as the excess vehicle speed RP_H increases.

At step S104, the controller 50 calculates, at the control parameters calculating section 55, a control parameter $\theta S\_R$ for the right-hand actuator 710 arranged to activate the right side portion 73a of the back rest 73 and a control parameter $\theta S\_L$ for the left-hand actuator 720 arranged to activate the left side portion 73b of the back rest 73. The control parameter $\theta S\_R$ represents an angle through which the right-side frame 712 swings, and $\theta S\_L$ represents an angle through which the left-side frame 722 swings. The control parameters $\theta S\_R$ and $\theta S\_L$ are determined as a function of the in-lane lateral position RP_S.

Figure 9:
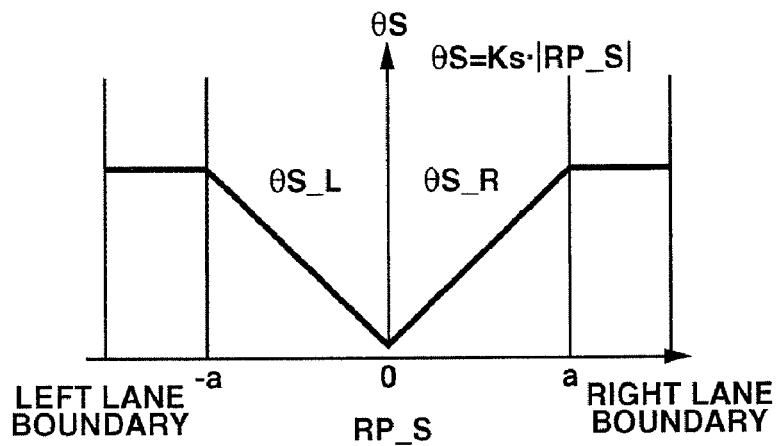
FIG. 9 is a graphical representation of varying of a control parameter θS, which generally represents control parameters θS_R and θS_L, with different values of an in-lane lateral position RP_S.
Figure 10:
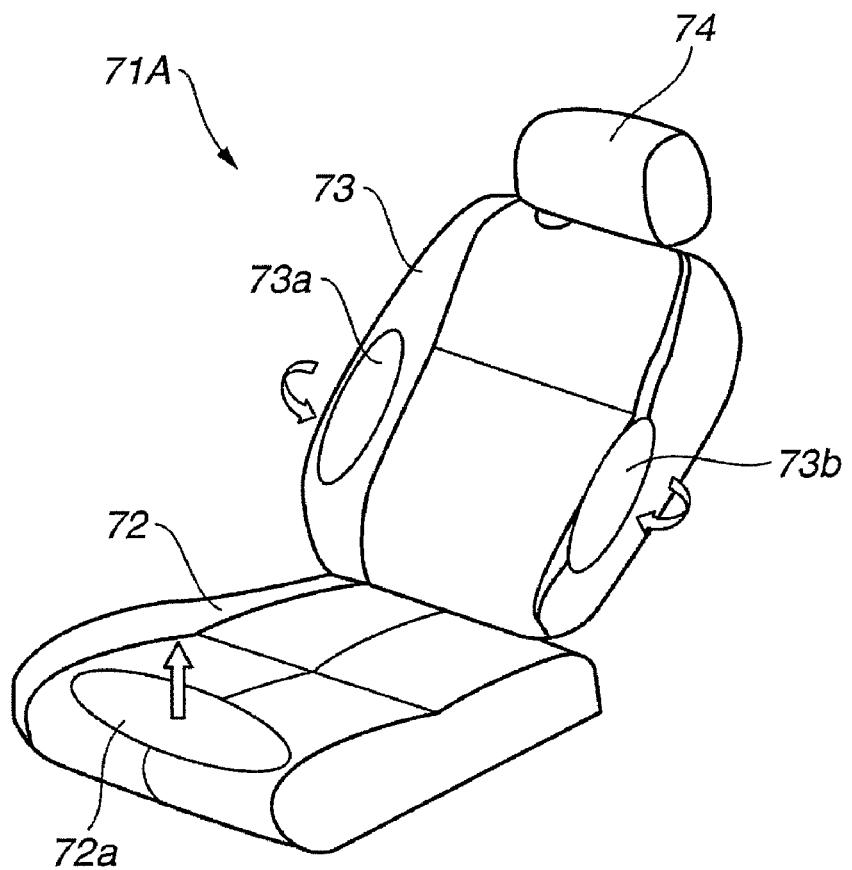
FIG. 10 is a perspective view of a driver's seat illustrating a second exemplary embodiment.

The fully drawn line in FIG. 9 illustrates varying of the control parameter $\theta S\_R$ and $\theta S\_L$ with different values of the in-lane lateral position RP_S. If the in-lane lateral position RP_S is a positive value indicating that the host vehicle is traveling within a lane at a right half region between the centerline and the lane boundary on the right, the right-side actuator 710 operates. If the in-lane lateral position RP_S is a negative value indicating that the host vehicle is traveling within the lane at a left half region between the centerline and the lane boundary on the left, the left-side actuator 720 operates. In FIG. 9, the control parameters θS_R and θS_L for the right- and left-side actuators 710 and 720 are generally denoted by θS. If the in-lane lateral position RP_S falls in a predetermined range (−a≦RP_S≦a) including the centerline, the control parameter θS is calculated from the following equation:

$$\theta S = Ks \cdot |RP\_S| \quad \text{(Eq. 4)}$$

In the equation Eq. 4, the coefficient Ks takes a value that has been calculated at step S103. If the in-lane lateral position RP_S falls outside of the predetermined range± a indicating that the host vehicle has approached one of the lane boundaries, the control parameter θS is fixed.

As shown in FIG. 9, the larger the absolute value of the in-lane lateral position |RP_S|, the larger is the control parameter θS, which denotes generally the control parameters θS_R and θS_L for the right- and left-hand actuators 710 and 720. If the in-lane lateral position RP_S falls outside of the predetermined range± a indicating that the vehicle has approached one of the lane boundaries, the control parameter θS is fixed at a value, which the control parameter θS takes when the in-lane lateral position RP_S is −a or +a. The closer the vehicle approaches one of the lane boundaries away from the centerline, the greater is an angle through which the side portion less remote from the one lane boundary swings. The side portion less remote from the lane boundary applies to the side of the driver a pressure input that increases with vehicle approaching the one lane boundary.

In FIG. 6, at step S105, the controller 50 determines the sigh of the in-lane lateral position RP_S calculated at step S102. If the in-lane lateral position RP_S is greater than or equal to 0 (RP_S≧0), that is, if the host vehicle is traveling within the lane at the right half region, the program proceeds to step S106. At step S106, the controller 50 provides, as an output, the control parameter θS_R, calculated at step S104, to the right-side actuator 710. If at step S102, the in-lane lateral position RP_S is less than 0 (RP_S<0), that is, if the host vehicle is traveling within the lane at the left half region, the program proceeds to step S104. At step S104, the controller 50 provides, as an output, the control parameter θS_L, calculated at step S104, to the left-side actuator 720.

At step S114, the controller 50 provides, as an output, the control parameter L_S to the middle actuator 730. In response to commands from the controller 50, the right- and left-side actuators 710 and 720 move the right and left side frames 712 and 722 in rotational directions, respectively, thus pressing the right and left side portions 73a and 73b against the driver. In response to command from the controller 50, the middle actuator 730 presses the seat back plate 732, thus pressing the middle portion 73c against the driver. Execution of the program ends immediately after one of the steps S106, S107 and S114.

For calculation of the control parameters θS_R and θS_L for the right- and left-side actuators 710 and 720, the coefficient Ks may be an appropriate fixed value rather than calculating the coefficient Ks based on the excess vehicle speed RP_H. However, the use of the coefficient Ks based on the excess vehicle speed RP_H is advantageous in that the longitudinal and lateral information are steadily transmitted to the driver by various pressure inputs via different portions of the seat 71. If the driver is pushed in a forward direction by the middle actuator 730, contact areas through which the right and left side portions 73a and 73b are pressed against the driver become small. Under this condition, the driver tends to feel a drop in pressure input via each of the right and left side portions 73a and 73b. It is desired to optimize the coefficient Ks to reliably transmit the longitudinal and lateral information to the driver via pressure inputs via the seat 71 by restraining the driver from tending to feel such drop.

The first exemplary embodiment provides such effects as:

(1) The driver assisting system 1 detects or senses longitudinal information with respect to the vehicle and lateral information with respect to the vehicle, and transmits the longitudinal and lateral information by different haptic inputs via a seat (a driver's seat) 71, making it possible for a driver to clearly and distinctly perceive plural pieces of information needed for driving the vehicle.

(2) The system detects, as the lateral information, an in-lane lateral position RP_S. The system transmits the in-lane lateral position RP_S to the driver to make it possible for the driver to perceive a degree of approach toward the adjacent lane boundary.

(3) The system detects, as the longitudinal information, an excess vehicle speed RP_H. The system transmits the excess vehicle speed RP_H to the driver, causing the driver to perceive a future increase in risk intuitively and prompting the driver to driving the vehicle appropriately.

(4) The driver assisting system 1 transmits actual running environment to the driver strongly by a haptic input (pressure input) via the seat 71. For example, the driver feels that the vehicle is traveling at speeds higher than the actual vehicle speed because the driver is pushed forwardly from lumbar that is pressed forwardly via the middle portion 73c of the back rest 73. This make it possible for the driver to shift quickly to appropriate operation to drive the vehicle to void future risk.

(5) The seat driver mechanism 70 can provide pressure inputs from different portions thereof. Thus, the excess vehicle speed RP_H and in-lane lateral position RP_S can be clearly transmitted to the driver via the different portions of the seat 72, making it possible to clearly transmit the longitudinal and lateral information to the driver.

(6) Based on the excess vehicle speed RP_H, the controller 50 corrects a pressure input that is applied to the driver via a portion of the seat 71 to transmit the in-lane lateral position RP_S to the driver. Specifically, the coefficient Ks (Eq. 3) is calculated, which is used to calculate the in-lane lateral position (RP_S) dependent control parameter θS based on the excess vehicle speed RP_H. As a result, the control parameter θS increases as the excess vehicle speed RP_H increases, so that the information on environment surrounding the vehicle is transmitted strongly when it is anticipated that there is an increase in excess vehicle speed RP_H and a high future risk.

Second Exemplary Embodiment

Figure 19:
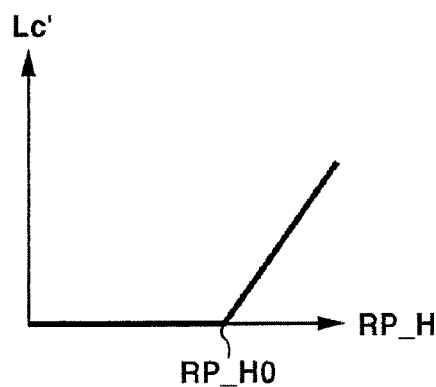
FIG. 19 is a graphical representation of varying of a control parameter Lc with different values of the excess vehicle speed RP_H.

Referring to FIGS. 1, 2, 10 and 11, the second exemplary embodiment is described below. The second exemplary embodiment is substantially the same as the first exemplary embodiment. However, the second exemplary embodiment is different from the first exemplary embodiment in that, instead of the middle actuator 730 arranged to actuate the middle portion 73c, a cushion front portion actuator is provided to actuate a front portion 72a of a cushion portion 72 of a driver's seat 71A as shown in FIG. 19. The cushion front portion actuator regulates pressure input applied to a driver via the front portion 72a by regulating pressure within an air bag embedded in the cushion portion 72.

In the second exemplary embodiment, a controller 50 calculates a cushion front portion actuator control parameter for the cushion front portion actuator based on an excess vehicle speed RP_H. The cushion front portion actuator control parameter is internal pressure of an air bag. The setting is such that the greater the excess vehicle speed RP_H, the greater the cushion front portion control parameter is. Thus, the greater the excess vehicle speed RP_H, the greater is a pressure input applied to the rear of femoral regions of the driver via the front portion 72a of the cushion portion 72. Applying a pressure input to the rear of femoral regions causes the driver to recognize need for manual operation of accelerator pedal intuitively. Accordingly, the driver can attend to deceleration operation immediately after recognition of the excess vehicle speed RP_H from the pressure input applied to the rear of femoral regions.

Figure 11:
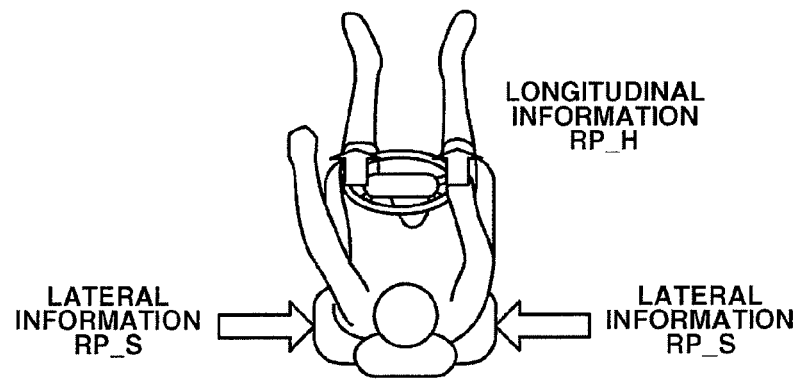
FIG. 11 is a diagram illustrating pieces of information to be transmitted to a driver via the driver's seat shown in FIG. 10.

In the same manner as the first exemplary embodiment, a control parameter θS_R for a right-side actuator 710 and a control parameter θS_L for a left-side actuator 720 are calculated based on an in-lane lateral position RP_S. Referring to FIG. 11, the longitudinal information, that is, the excess vehicle speed RP_S, is transmitted to the driver by a pressure input to the rear of femoral regions via the front portion 72a of the cushion portion 72, and the lateral information, that is, the in-lane lateral position RP_S of the host vehicle, by a pressure input to the adjacent side to a lane boundary which the vehicle is approaching via one of side portions 73a and 73b.

As described above, the transmission of the longitudinal information via the front portion 72a of the cushion portion 72 according to the second exemplary embodiment is as clear as the transmission of the longitudinal direction via the middle portion 73c of the back rest 73 according to the first exemplary embodiment.

Third Exemplary Embodiment

Referring to FIGS. 1, 2, 3, 4 and 12, the third exemplary embodiment of a driver assisting system is described. The third exemplary embodiment is substantially the same as the first exemplary embodiment. The third exemplary embodiment is different from the first exemplary embodiment in that the middle actuator 730 of the seat driver mechanism 70 (see FIG. 1) is at rest or removed to keep the middle portion 73c stationary (see FIGS. 3 and 4). The third exemplary embodiment transmits the longitudinal information and lateral information to a driver occupying a driver's seat by activating a right-side actuator 710 and a left-side actuator 720 only.

Referring to FIGS. 3 and 4, the third exemplary embodiment of driver assisting system transmits an in-lane lateral position RP_S of the vehicle, which belongs to the lateral information, to the driver by a difference between two pressure inputs to the sides of the driver via side portions 73a and 73b of the backrest. Further, the system transmits an excess vehicle speed RP_H of the vehicle, which belongs to the longitudinal information, to the driver via two pressure inputs to hold the driver via the side portions 73a and 73b of the back rest 73.

Figure 12:
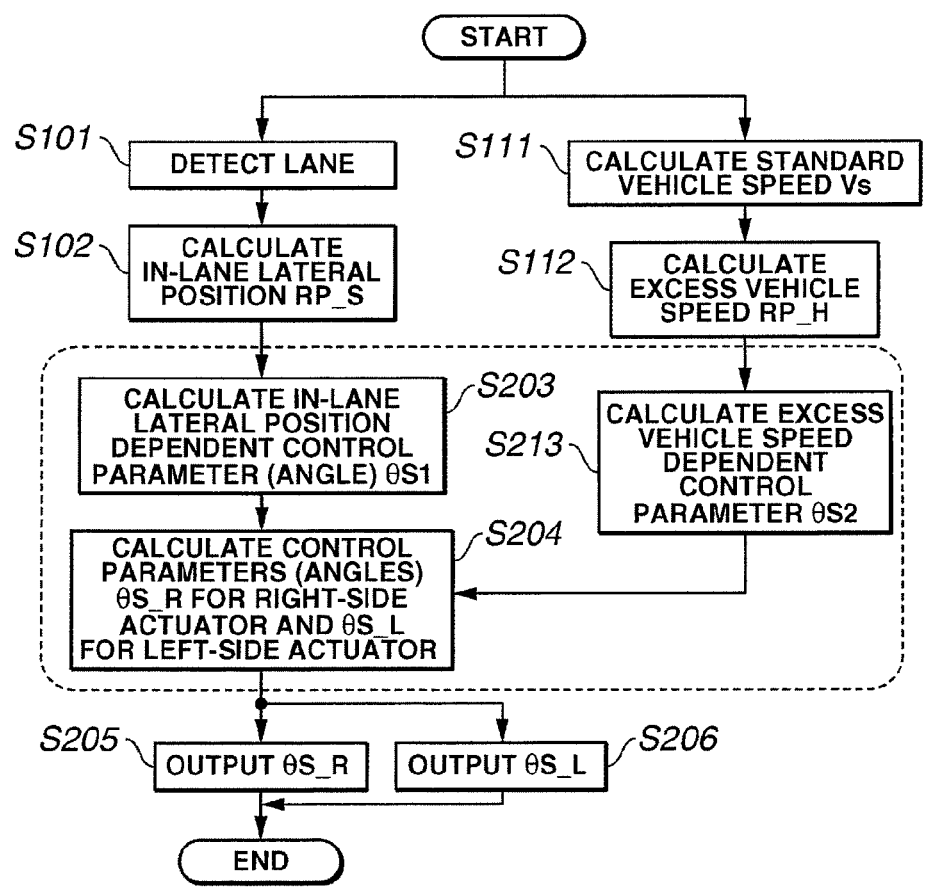
FIG. 12 is a flow chart illustrating the operation of a third exemplary embodiment.

Referring to FIG. 12, it is described how the driver assisting system according to the third exemplary embodiment operates. The flow chart in FIG. 12 illustrates a control program for assisting a driver of the vehicle. The execution of the control program is repeated at regular interval of 50 milliseconds. The flow chart in FIG. 12 is substantially the same as the flow chart in FIG. 6 so that like reference numerals are used throughout FIGS. 6 and 12 to designate like steps. The flow charts in FIGS. 12 and 6 contain the steps S101, S102, S111 and S112 in common. Thus, description on these steps is hereby omitted. In FIG. 12, the steps S102 and S112 are followed by steps S203 and S213, respectively.

At step S203, a controller 50 calculates a control parameter θS1 based on an in-lane lateral position RP_S that is calculated at step S102. The control parameter θS1 may be expressed as:

$$\theta S1 = Ks \cdot |RP\_S| \qquad \text{(Eq. 5)}$$

A coefficient Ks is the predetermined appropriate value, but Ks may be determined based on the excess vehicle speed RP_H using, for example, the equation Eq. 3 in the same manner as in the first exemplary embodiment. The control parameter θS1 is kept at a fixed value after having grown to the fixed value upon the in-lane lateral position RP_S exceeding a predetermined value± a toward one of the lane boundaries.

At step S213, the controller 50 calculates a control parameter θS2 based on the excess vehicle speed RP_H that is calculated at step S112. The control parameter θS2 may be expressed as:

$$\theta S2 = Kh \cdot |RP\_H| \qquad \text{(Eq. 6)}$$

where: a coefficient Kh is a predetermined appropriate value.

At the next step S204, the controller 50 calculates a control parameter θS_R for the right-side actuator 710 and a control parameter θS_L for the left-side actuator 720 using the in-lane lateral position RP_S dependent control parameter θS1 and the excess vehicle speed RP_H dependent control parameter θS2.

If the vehicle is traveling in close to the lane boundary on the right (RP_S≧0), the control parameters θS_R and θS_L are given by:

$$\theta S\_R = \theta S1 + \theta S2$$

$$\theta S\_L = \theta S2 \qquad \text{(Eq. 7)}$$

If the vehicle is traveling in close to the lane boundary on the left (RP_S<0), the control parameters θS_R and θS_L are given by:

$$\theta S\_R = \theta S2$$

$$\theta S\_L = \theta S1 + \theta S2 \qquad \text{(Eq. 8)}$$

Figure 13:
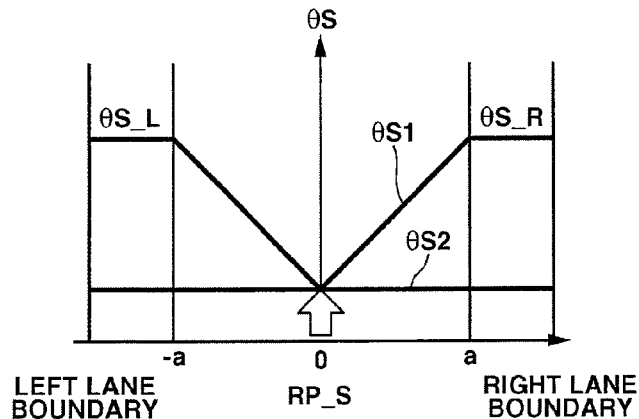
FIG. 13 is a graphical representation of varying of the sum of a control parameter θS1 and a control parameter θS2 with different values of an in-lane lateral position RP_S.

Referring to FIG. 13, the fully drawn bent line illustrates varying of the sum of control parameter θS1 and control parameter θS2 with different values of in-lane lateral position RP_S, and the fully drawn straight horizontal line illustrates the control parameter θS2. In the right-half of FIG. 13 (RP_S≧0), the bent line illustrates varying of control parameter θS_R with different values of in-lane lateral position RP_S, and the horizontal line illustrates control parameter θS_L if the excess vehicle speed RP_H is constant. In the left-half of FIG. 13 (RP_S<0), the bent line illustrates varying of control parameter θS_L with different values of in-lane lateral position RP_S, and the horizontal line illustrates control parameter θS_R if the excess vehicle speed RP_H is constant. FIG. 13 clearly show that a difference between the control parameters θS_R and θS_L is proportional to the absolute value of in-lane lateral position |RP_S| within a region limited by ±a. This difference grows from zero to the maximum value and stays at the maximum value when the in-lane lateral position RP_S falls outside this region.

At step S205, the controller 50 provides, as an output, the control parameter θS_R, calculated at step S204, to the right-side actuator 710. At step S206, the controller 50 provides, as an output, the control parameter θS_L, calculated at step S204, to the left-side actuator 720. In response to commands from the controller 50, the right- and left-side actuators 710 and 720 move the right and left side frames 712 and 722 in rotational directions, respectively, thus pressing the right and left side portions 73a and 73b against the sides of the driver to transmit the lateral and longitudinal information to the driver.

Figure 14:
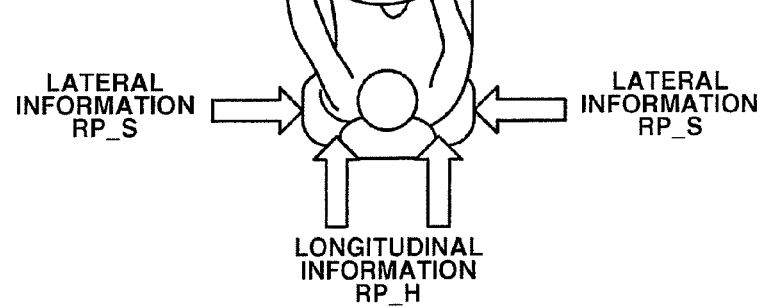
FIG. 14 is a diagram illustrating pieces of information to be transmitted to a driver via a driver's seat.

Referring to FIG. 14, the third exemplary embodiment transmits the longitudinal information, that is, the excess vehicle speed RP_H, to the driver by pressure inputs via the side portion on the right 73a of the back rest 73 and the side portion on the left 73b of the back rest 73 to hold the driver. It also transmits the lateral information, that is, the in-lane lateral position RP_S indicative of a degree of approach to a lane boundary, to the driver by a difference between pressure inputs via the side portions 73a and 73b of the back rest 73 by pressing the side portion 73a or 73b near the lane boundary against the side of the driver more firmly than the other side portion 73b or 73a to create the difference between the pressure inputs.

Modification to the Third Exemplary Embodiment

A modified third exemplary embodiment of a driver assisting system transmits to the driver the longitudinal information only within a lane centerline region when an excess vehicle speed RP_H is less great although it transmits to the driver the lateral information also within the other regions outside the lane centerline region. As the excess vehicle speed RP_H increases, the lane centerline region shrinks. When the excess vehicle speed RP_H is great, the lane centerline region disappears so that the driver assisting system transmits to the driver both of longitudinal and lateral information over the entire regions including the lane centerline.

Control parameters θS_R and θS_L for right-side and left-side actuators 710 and 720 are determined as described below.

First, an in-lane lateral position RP_S dependent control parameter θS1 is calculated using the equation Eq. 5 and an excess vehicle speed RP_H dependent control parameter θS2 is calculated using the equation Eq. 6.

Next, the lane centerline region RP_S0, which prohibits transmission of the lateral information, that is, the in-lane lateral position RP_S, is calculated using the following equation:

$$RP\_S0 = Kh \cdot (1 - Kh3 \cdot RP\_H) \quad \text{(Eq. 9)}$$

In the equation Eq. 9, a coefficient Kh3 of the product (Kh3·RP_H) takes such an appropriate value that the product grows to a value 1 if the excess vehicle speed RP_H grows to the maximum value RP_Hmax. The more the excess vehicle speed RP_H increases, the more the lane centerline region RP_S0 shrinks.

Figure 15:
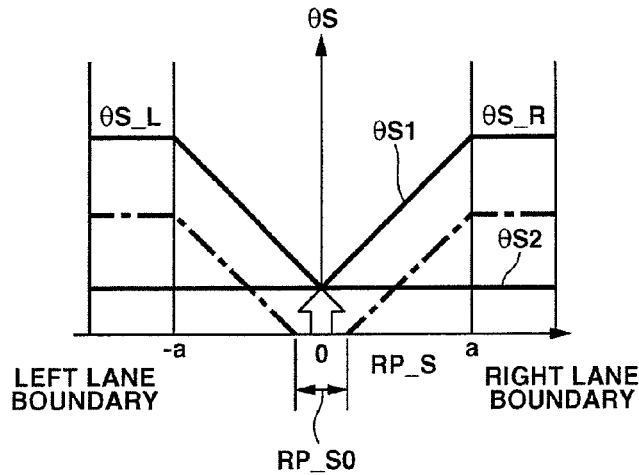
FIG. 15 is a graphical representation similar to FIG. 13, illustrating a modification to the third exemplary embodiment.

FIG. 15 is similar to FIG. 13 in that the fully drawn bent and straight horizontal lines indicate varying of the control parameters θS_R and θS_L with different values of in-lane lateral position RP_S, but the former is different from the latter in that the modified third exemplary embodiment attains the illustrated relationship only when the excess vehicle speed RP_H is equal to the maximum value RP_Hmax. In FIG. 15, the one-dot chain line on the right-hand side of the lane centerline region RP_S0 indicates varying of the control parameter θS_R with different values of in-lane lateral position RP_S outside the lane centerline region RP_S0 when the excess vehicle speed RP_H is zero. Similarly, the one-dot chain line on the left-hand side of the lane centerline region RP_S0 indicates varying of the control parameter θS_L with different values of in-lane lateral position RP_S outside the lane centerline region RP_S0 when the excess vehicle speed RP_H is zero. When the excess vehicle RP_H is less than the maximum value RP_Hmax but greater than zero, the lane centerline region RP_S0 shrinks in width. In this case, the control parameters θS_R and θS_L are equal to the excess vehicle speed dependent control parameter θS2. Immediately after the in-lane lateral position RP_S has left the lane centerline region RP_S0 to fall in the region on the right-hand side, the control parameter θS_R begins to increase from a level as high as the control parameter θS2, while the control parameter θS_L remains equal to the control parameter θS2. Under this condition, the control parameter θS_R is given as the sum of θS2 and [Ks·{|RP_S|−|RP_S0/2|}]. Immediately after the in-lane lateral position RP_S has left the lane centerline region RP_S0 to fall in the region on the left-hand side, the control parameter θS_L begins to increase from a level as high as the control parameter θS2, while the control parameter θS_L remains equal to the control parameter θS2. Under this condition, the control parameter θS_L is given as the sum of θS2 and [Ks·{|RP_S|3| |RP_S0/2|}].

In addition to the effects provided by the first exemplary embodiment, the third exemplary embodiment and its modification provide effects as follows:

(1) The seat driver mechanism 70 operates to apply different, in magnitude, pressure inputs to the driver out of different portions of the seat 71. The excess vehicle speed RP_H and in-lane lateral position RP_S are transmitted to the driver by different, in magnitude, pressure inputs out of the same portion of the seat 71. Specifically, the excess vehicle speed RP_H and in-lane lateral position RP_S are transmitted to the driver via different pressure inputs out of the side portions on the right and left 73a and 73b. As shown in FIG. 13, the excess vehicle speed RP_H is transmitted to the driver by pressure inputs to hold the driver via the side portions on the right and left 73a and 73b. The in-lane lateral position RP_S is transmitted to the driver by a difference between the pressure inputs via the side portions on the right and left 73a and 73b.

(2) When the excess vehicle speed RP_H is less than the predetermined value RP_Hmax, a region may be set about the lane centerline in which the transmission of the in-lane lateral position RP_S is restricted. As shown in FIG. 15, varying the region RP_S0 with different values of the excess vehicle speed RP_H and holding the control parameter θS1 invariable with different values of the in-lane lateral position RP_S are effective to appropriately weight pieces of information to be transmitted to the driver in response to running conditions of the vehicle. The longitudinal information and lateral information are clearly and distinctly transmitted to the driver.

Fourth Exemplary Embodiment

Referring to FIGS. 1, 2, 10 and 16 to 20, the fourth exemplary embodiment of a driver assisting system is described below. The fourth exemplary embodiment is substantially the same as the first exemplary embodiment in its basic hardware. The fourth exemplary embodiment is different from the first exemplary embodiment in that, instead of the middle actuator 730, a driver's seat 71A (see FIG. 10) is provided with a cushion front portion actuator to activate a front portion 72a of a cushion portion 72. The cushion front portion actuator conducts adjustment of a pressure input to a driver by regulating pressure within an air bag embedded in the cushion portion 72 in the same manner as the second exemplary embodiment.

The driver assisting system according to the fourth exemplary embodiment transmits longitudinal information by holding the driver via a side portion on the right 73a and a side portion on the left 73b and/or by a pressure input via the front portion 72a of the cushion portion 72. The system transmits lateral information by pressure inputs via the side portion on the right 73a and the side portion on the left 73b.

Figure 16:
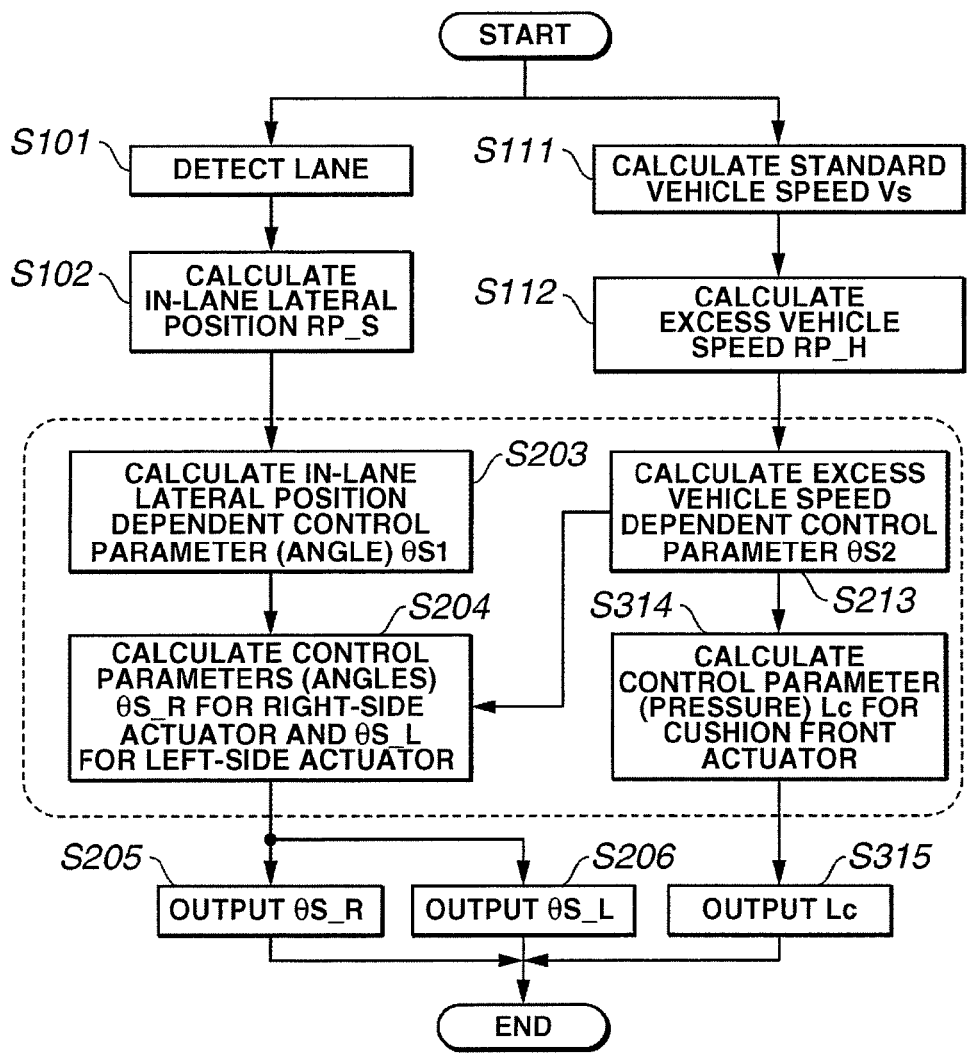
FIG. 16 is a flow chart illustrating the operation of a fourth exemplary embodiment.

Referring to FIG. 16, it is now described how the fourth exemplary embodiment of the driver assisting system operates. The flow chart in FIG. 16 illustrates a control program conducting processes of assisting the driver according to the fourth exemplary embodiment. Execution of this control program is repeated at regular interval of 50 milliseconds. The flow chart in FIG. 16 is substantially the same as the flow chart in FIG. 12. Like reference numerals are used to designate like steps throughout FIGS. 12 and 16. The flow charts in FIGS. 12 and 16 contain steps S101, S102, S111, S112, S203, S204 and S213 in common.

Figure 17:
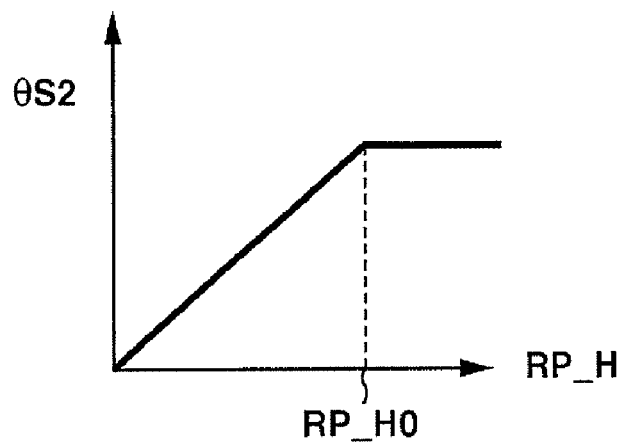
FIG. 17 is a graphical representation of varying of a control parameter θS2 with different values of an excess vehicle speed RP_H.

In FIG. 16, at step S203, the control program calculates a control parameter θS1, using the equation Eq. 5, based on an in-lane lateral position RP_S that was calculated at S101. At step S213, the control program calculates a control parameter θS2, using the equation Eq. 6, based on an excess vehicle speed RP_H that was calculated at step S112. As shown in FIG. 17, the control parameter θS2 is proportional to the excess vehicle speed RP_H and fixed at the maximum value when the excess vehicle speed RP_H exceeds a predetermined value RP_H0.

Figure 18:
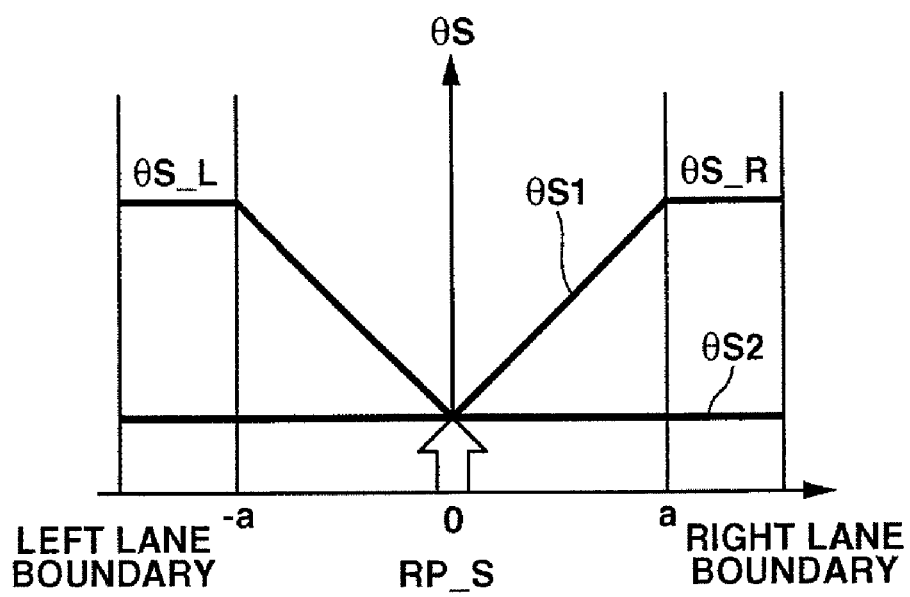
FIG. 18 is a graphical representation similar to FIG. 13.

At step S204, the control program calculates a control parameter θS_R for a right-side actuator 710 and a control parameter θS_L for a left-side actuator 720 based on the in-lane lateral position (RP_S) dependent control parameter θS1 calculated at step S203 and based on the excess vehicle speed (RP_H) dependent control parameter θS2 calculated at step S213, respectively. Referring to FIG. 18, the fully drawn bent line illustrates varying of the sum of control parameter θS1 and control parameter θS2 with different values of in-lane lateral position RP_S, and the fully drawn straight horizontal line illustrates the control parameter θS2. In the right-half of FIG. 18 (RP_S≧0), the bent line illustrates varying of control parameter θS_R with different values of in-lane lateral position RP_S, and the horizontal line illustrates control parameter θS_L if the excess vehicle speed RP_H is constant. In the left-half of FIG. 18 (RP_S<0), the bent line illustrates varying of control parameter θS_L with different values of in-lane lateral position RP_S, and the horizontal line illustrates control parameter θS_R if the excess vehicle speed RP_H is constant. FIG. 18 clearly show that a difference between the control parameters θS_R and θS_L is proportional to the absolute value of in-lane lateral position |RP_S| within a region limited by ±a. This difference grows from zero to the maximum value and stays at the maximum value when the in-lane lateral position RP_S falls outside this region.

At step S314, the control program calculates a control parameter Lc (pressure within the air bag) for the cushion front portion actuator based on the excess vehicle speed RP_H calculated at step S312. As shown in FIG. 19, the control parameter Lc is zero when the excess vehicle speed RP_H is less than or equal to the predetermined value RP_H0, and the control parameter Lc increases in proportional relationship with the excess vehicle speed RP_H when the excess vehicle speed RP_H exceeds the predetermined value RP_H0.

At step S205, the control parameter θS_R calculated at step S204 is provided to the right-side actuator 710. At step S206, the control parameter θS_L calculated at step S204 is provided to the left-side actuator 720. At step S315, the control parameter Lc calculated at step S314 is provided to the cushion front portion actuator.

Figure 20:
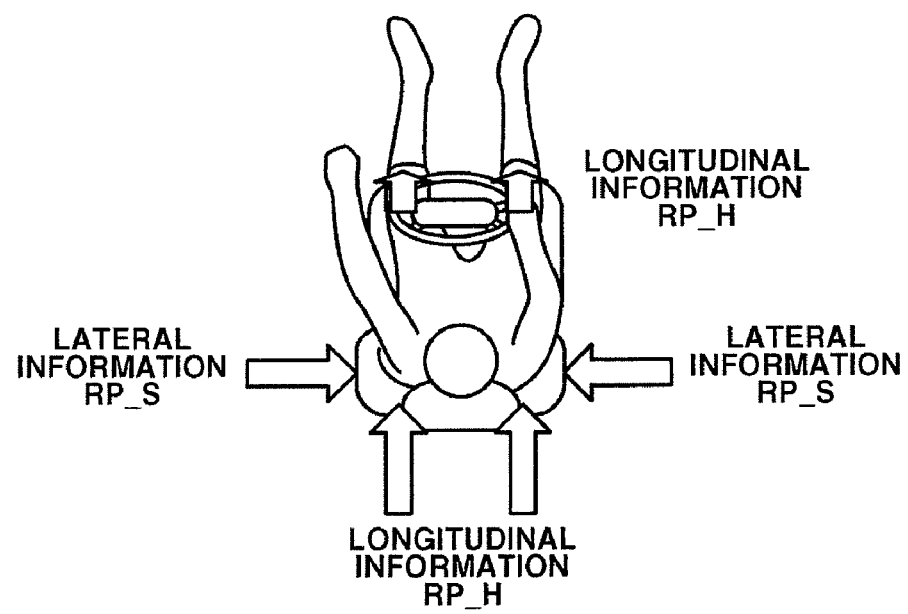
FIG. 20 is a diagram illustrating pieces of information to be transmitted to a driver via a driver's seat shown in FIG. 10.

Referring to FIG. 20, the fourth exemplary embodiment transmits the longitudinal information, that is, the excess vehicle speed RP_H, to the driver by pressure inputs via the side portion on the right 73a of the back rest 73 and the side portion on the left 73b of the back rest 73 to hold the driver. It also transmits the lateral information, that is, the in-lane lateral position RP_S indicative of a degree of approach to a lane boundary, to the driver by a difference between pressure inputs via the side portions 73a and 73b of the back rest 73 by pressing the side portion 73a or 73b near the lane boundary against he side of the driver more firmly than the other side portion 73b or 73a to create the difference between the pressure inputs.

The fourth exemplary embodiment transmits the excess vehicle speed RP_H by pressure input via portions, which vary with different values of the excess vehicle speed RP_H. Concretely, the fourth exemplary embodiment transmit the excess vehicle speed RP_H to the driver by pressure inputs to hold the driver via the side portions 73a and 73b of the back rest 73 when the excess vehicle speed RP_H is less than or equal to the predetermined value RP_H0. When the excess vehicle speed RP_H exceeds the predetermined value RP_H0, the fourth exemplary embodiment transmits the excess vehicle speed RP_H by a pressure input to the rear of femoral regions of the driver via the cushion front portion 72a in addition to pressure inputs to hold the driver via the side portions 73a and 73b of the back rest 73. Accordingly, both the longitudinal and lateral information are transmitted to the driver via the side portions 73a and 73b when the excess vehicle speed RP_H is less. When the excess vehicle speed RP_H is great, the pressure input is applied to the rear of femoral regions of the driver via the cushion front portion 72a in addition to pressure inputs to hold the driver via the side portions 73a and 73b. Applying the pressure input to the rear of femoral regions causes the driver to recognize need for manual operation of accelerator pedal intuitively.

In each of the first to fourth exemplary embodiments, the excess vehicle speed RP_H has been used as the longitudinal information to be transmitted to the driver. Instead of the excess vehicle speed RP_H, the vehicle speed V of the host vehicle may be transmitted to the driver as the longitudinal information.

In driver's seats 71 and 71A, the portions via which pressure input may applied to the driver are not limited to illustrated examples according to the first to fourth exemplary embodiments. For example, side portions 73a and 73b of a back rest 73 may be located to apply pressure input to shoulders of the driver. The system may apply pressure input to the driver via a side portion on the right and a side portion on the left of a cushion portion 72. In the second exemplary embodiment, it is possible to arrange more than two air bags in parallel at a front portion of the cushion portion 72. The portions via which pressure inputs are applied to the driver are not limited to the illustrated examples according to the first to fourth exemplary embodiments. These portions may be chosen so as to applying effective haptic input to the driver to transmit running environment around the vehicle.

In the preceding description of the first to fourth exemplary embodiments, the vehicle speed sensor, navigation system 30 and excess vehicle speed calculating section 54 constitute means for detecting longitudinal information, the front camera 10 and in-lane lateral position calculating section 52 constitute means for detecting lateral information, and the controller 50 and seat driver mechanism 70 constitute means for transmitting information. The seat motion control parameters calculating section 55 constitutes means for correcting seat pressure and means for setting range to limit the lateral information.

Fifth Exemplary Embodiment

Figure 21:
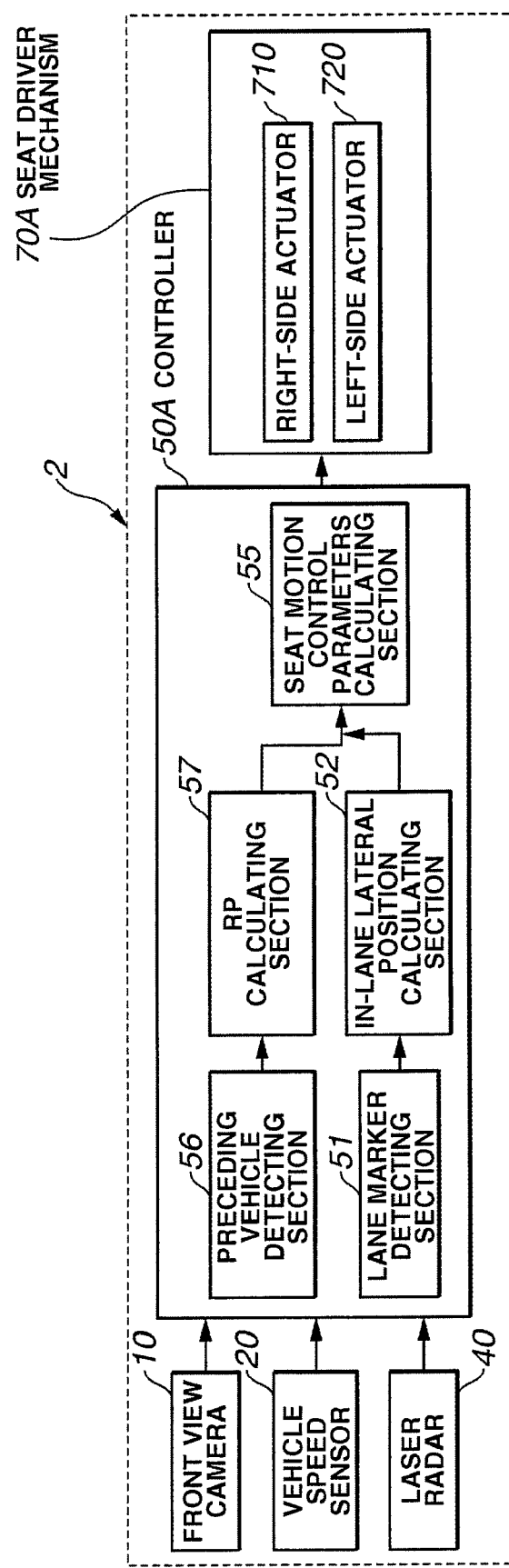
FIG. 21 is a block diagram illustrating a fifth exemplary embodiment of a driver assisting system according to the present invention.

Referring to FIGS. 21-25, the fifth exemplary embodiment of a driver assisting system is described below. FIG. 21 is a block diagram illustrating functional elements constituting the fifth exemplary embodiment of driver assisting system 2. The fifth exemplary embodiment is substantially the same as the first exemplary embodiment shown in FIGS. 1 to 9. Like reference numerals are used to designate like parts or portions throughout FIGS. 1 to 9 and 21 to 25.

However, the driver assisting system 2 shown in FIG. 21 is different from the driver assisting system 1 shown in FIG. 1 in that 1) a laser radar 40 is provided instead of the navigation system 30; 2) a controller 50A includes a preceding vehicle detecting section 56 and a risk potential (RP) calculating section 57 instead of the standard vehicle speed calculating section 53 and excess vehicle speed calculating section 54 of the controller 50; and 3) a seat driver mechanism 70A is not provided with the middle actuator 730 of the seat driver mechanism 70.

The laser radar 40 is mounted to the vehicle at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as, a rear bumper of a preceding vehicle. The laser radar 40 can provide a distance D to a preceding vehicle in front and a relative speed Vr to the preceding vehicle. The laser radar 40 provides, as outputs, the detected distance D and relative speed Vr to the controller 50A.

The controller 50A is provided with a lane marker detecting section 51, an in-lane lateral position calculating section 52, the preceding vehicle detecting section 56, the RP calculating section 57, and a seat motion control parameters calculating section 55. The preceding vehicle detecting section 56 detects a preceding vehicle in front of a host vehicle based on signals from a front camera 10 and the laser radar 40. The RP calculating section 57 calculates a risk potential, a collision risk between the host vehicle and the preceding vehicle detected at the preceding vehicle detecting section 56, and provides the risk potential as longitudinal information of the host vehicle.

Figure 22:
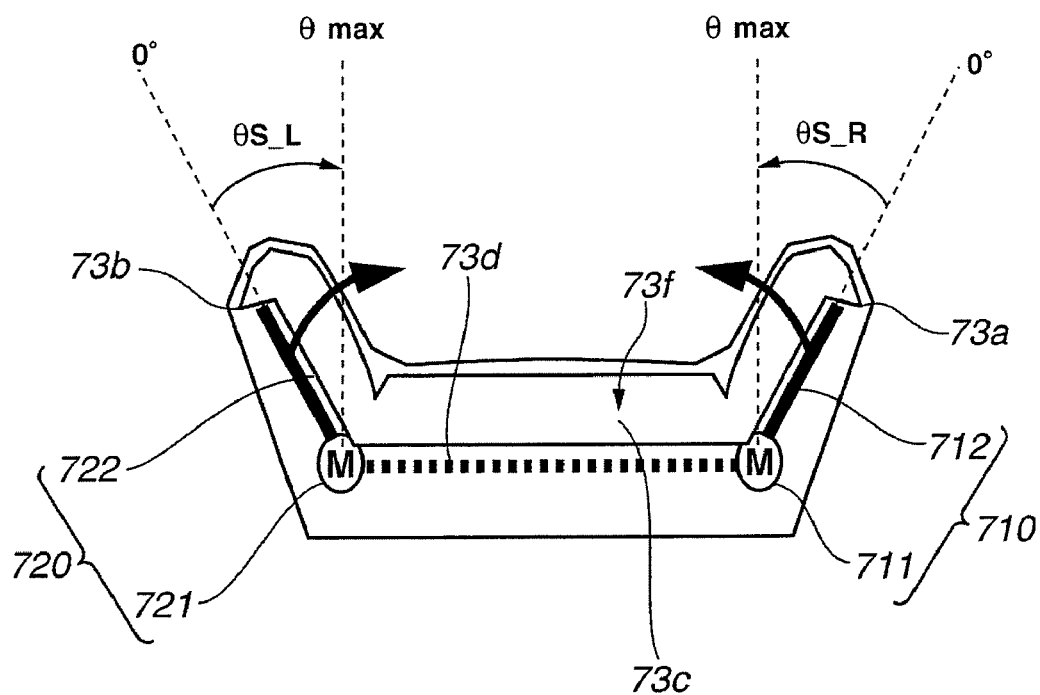
FIG. 22 is a cross sectional view similar to FIG. 4 illustrating a driver's seat used in the fifth exemplary embodiment.

The seat motion control parameters calculating section 55 calculates control parameters for the seat driver mechanism 70A based on the in-lane lateral position calculated at the in-lane lateral position calculating section 52 and the risk potential calculated at the RP calculating section 57. Referring to FIGS. 21 and 22, the seat driver mechanism 70A is not provided with the middle actuator 730. The fifth exemplary embodiment transmits the longitudinal and lateral information to the driver by pressure inputs produced by activating a right-side actuator 710 and a left-side actuator 720.

In the fifth exemplary embodiment, the lateral information is a degree of approach to the adjacent lane boundary in the same manner as it is in the first exemplary embodiment. The longitudinal information is risk potential between the host vehicle and the preceding vehicle in front. To transmit the lateral information to the driver, a side portion on the right 73a of a back rest 73 and a side portion on the left 73b thereof swing in response to the in-lane lateral position RP_S of the host vehicle. To transmit the longitudinal information to the driver, the side portion on the right 73a and the side portion on the left 73b cooperatively swing to press the driver from the both sides, thereby holding the driver.

Figure 23:
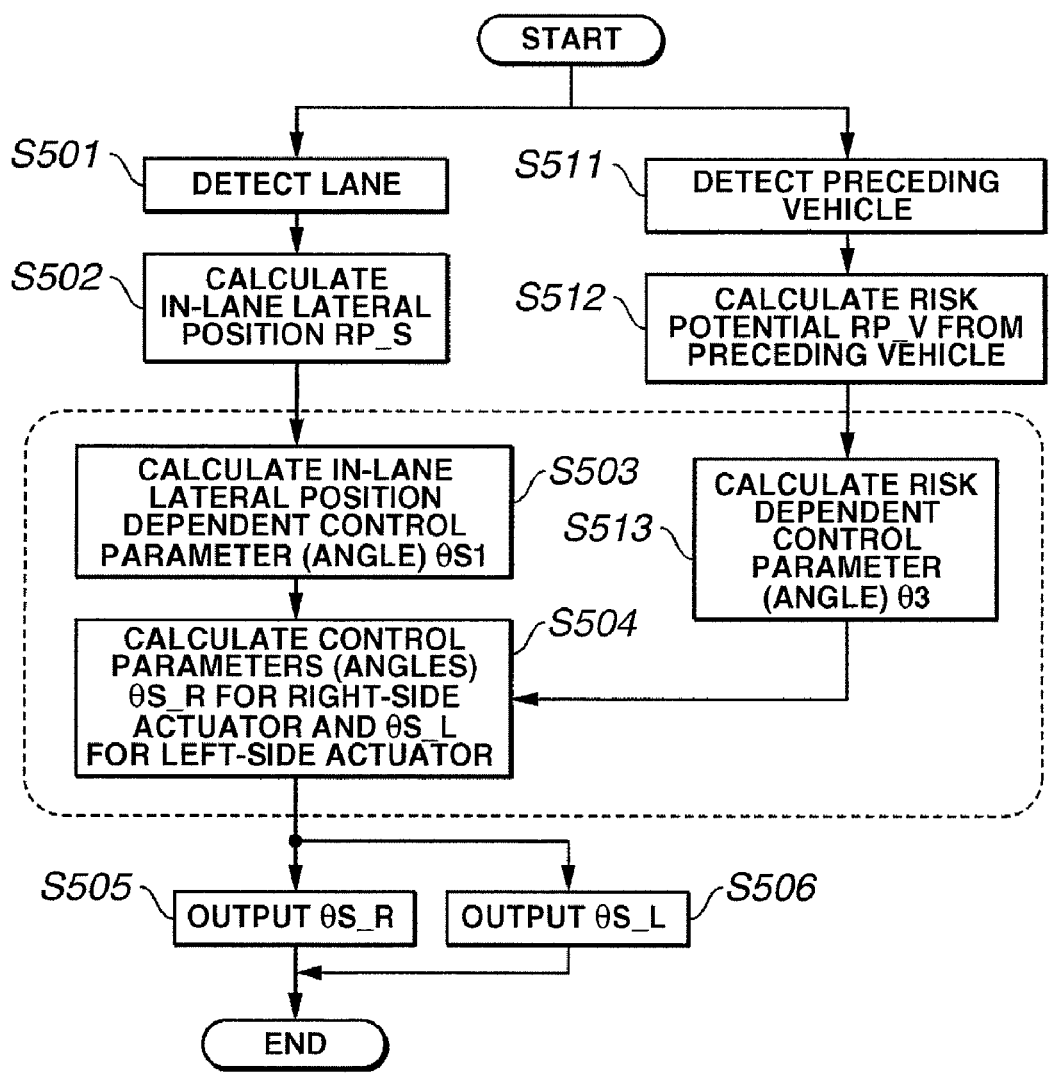
FIG. 23 is a flow chart illustrating the operation of the fifth exemplary embodiment.

Referring to FIG. 23, it is described below how the fifth exemplary embodiment operates. The flow chart in FIG. 23 illustrates a control program for assisting the driver. Execution of the control program is repeated at regular interval of 50 milliseconds.

In FIG. 23, at step S501, the controller 50A detects a lane which the vehicle is traveling on at the lane marker detecting section 51. Specifically, it recognizes lane markers defining the lane via image processing of the image picked up by the front camera 10.

At step S502, the controller 50A calculates a relative positional relationship of the host vehicle to the recognized lane markers. Specifically, it calculates an in-lane lateral position RP_S based on the processed image. In this embodiment, as shown in FIG. 7, the in-lane lateral position RP_S is a lateral position from a contrived centerline of the lane to a measurement point in front of and spaced a distance L from the host vehicle. This point is on an extension of a longitudinal line passing through a center of the host vehicle. The in-lane lateral position RP_S may be expressed as:

$$RP\_S = L \cdot \sin\theta + Xp \qquad (\text{Eq. 10})$$

where: $\theta$ is a yaw angle of the host vehicle;

Xp is a lateral distance of the center of the host vehicle from the contrived centerline of the lane.

The in-lane lateral position RP_S is zero when the measurement point is on the centerline of the lane, takes positive values in a direction toward the right away from the centerline, and takes negative values in the opposite direction to the left away from the centerline.

At step S503, the controller 50A calculates a control parameter $\theta$S1 based on an in-lane lateral position RP_S that is calculated at step S502. The control parameter $\theta$S1 may be expressed as:

$$\theta S1 = Ks \cdot |RP\_S| \qquad (\text{Eq. 11})$$

A coefficient Ks is the predetermined appropriate value, but Ks may be determined based on the excess vehicle speed RP_H using, for example, the equation Eq. 3 in the same manner as in the first exemplary embodiment. The control parameter $\theta$S1 is kept at a fixed value after having grown to the fixed value upon the in-lane lateral position RP_S exceeding a predetermined value ±a toward one of the lane boundaries.

At step S511, the controller 50A detects, at the preceding vehicle detecting section 56, a preceding vehicle in front of the host vehicle based on signals from the front camera 10 and laser radar 40. Concretely, the controller 50A recognizes the preceding vehicle by image processing of image signals covering an area in front picked up by the front camera 10, and it detects a distance D between the host vehicle and the preceding vehicle and a relative speed Vr between the host vehicle and the preceding vehicle.

At step S512, the controller 50A calculates, at the RP calculating section 57, a risk potential RP_V with regard to the preceding vehicle detected at step S511. In this exemplary implementation, in order to calculate the risk potential RP_V, the controller 50A calculates a time to collision TTC to the preceding vehicle and a time headway THW with respect to the preceding vehicle.

The TTC is a measure of time from a present or current moment to a future moment when the distance D would become zero if the relative speed Vr (Vr=Vp−V) to the preceding vehicle remains unaltered. Vp is a vehicle speed of the preceding vehicle, and V is a vehicle speed of the host vehicle. The TTC may be expressed as:

$$TTC = -D/Vr \qquad \text{(Eq. 12)}$$

The time headway THW quantifies a degree of influence on the TTC by an unpredictable drop in the vehicle speed of the preceding vehicle. The THW is a measure of a timer that is set to count up when the preceding vehicle reaches a point on a road and will be reset subsequently when the host vehicle will reach the same point. The THW may be expressed as:

$$THW = D/V \qquad \text{(Eq. 13)}$$

In the case where the host vehicle is following the preceding vehicle, the vehicle speed Vp of the preceding vehicle may be used instead of the vehicle speed V of the host vehicle in the above-mentioned equation Eq. 13.

The relationship between the two notions TTC and THW is such that a change in vehicle speed Vp, if any, of the preceding vehicle results in a small change in the TTC when the THW is long, but the same change in vehicle speed Vp of the preceding vehicle results in a large change in the TTC when the THW is short.

In this exemplary embodiment, the risk potential RP_V is calculated using the time to collision TTC and the time headway THW. The risk potential RP_V may be expressed as:

$$RP\_V = a/THW + b/TTC \qquad \text{(Eq. 14)}$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle following the preceding vehicle. In this exemplary implementation, b=8 and a=1.

At step S513, the controller 50A calculates a control parameter θS3 based on the risk potential RP_V that is calculated at step S512. The control parameter θS3 may be expressed as:

$$\theta S3 = Kv \cdot RP\_V \qquad \text{(Eq. 15)}$$

where: a coefficient Kv is a predetermined appropriate value.

At the next step S504, the controller 50A calculates a control parameter θS_R for the right-side actuator 710 and a control parameter θS_L for the left-side actuator 720 using the in-lane lateral position RP_S dependent control parameter θS1 (calculated at step S503) and the control parameter θS3 calculated at step S513 based on the risk potential RP_V.

If the vehicle is traveling in close to the lane boundary on the right (RP_S≧0), the control parameters θS_R and θS_L are given by:

$$\theta S\_R = \theta S1 + \theta S3$$
$$\theta S\_L = \theta S3 \qquad \text{(Eq. 16)}$$

If the vehicle is traveling in close to the lane boundary on the left (RP_S<0), the control parameters θS_R and θS_L are given by:

$$\theta S\_R = \theta S3$$
$$\theta S\_L = \theta S1 + \theta S3 \qquad \text{(Eq. 17)}$$

Figure 24:
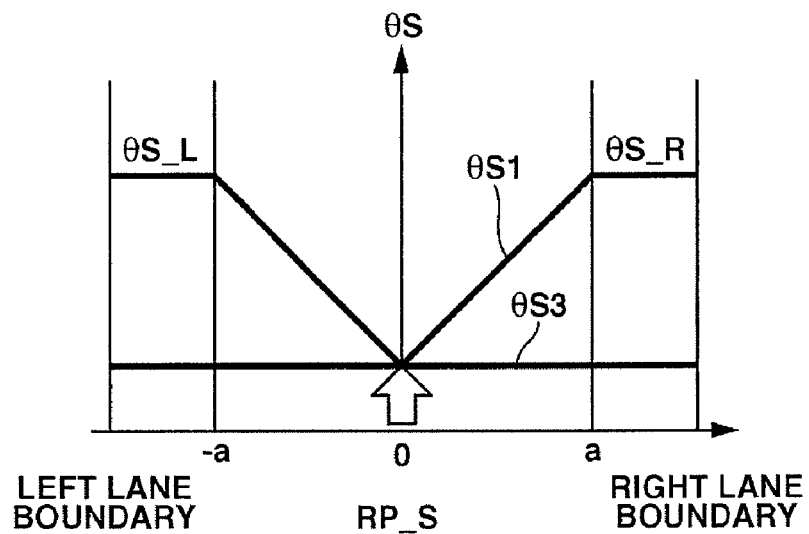
FIG. 24 is a graphical representation similar to FIG. 13, illustrating the fifth exemplary embodiment.

Referring to FIG. 24, the fully drawn bent line illustrates varying of the sum of control parameter θS1 and control parameter θS3 with different values of in-lane lateral position RP_S, and the fully drawn straight horizontal line illustrates the control parameter θS2. In the right-half of FIG. 24 (RP_S≧0), the bent line illustrates varying of control parameter θS_R with different values of in-lane lateral position RP_S, and the horizontal line illustrates control parameter θS_L if the risk potential RP_V is constant. In the left-half of FIG. 24 (RP_S<0), the bent line illustrates varying of control parameter θS_L with different values of in-lane lateral position RP_S, and the horizontal line illustrates control parameter θS_R if the risk potential RP_V is constant. FIG. 24 clearly shows that a difference between the control parameters θS_R and θS_L is proportional to the absolute value of in-lane lateral position |RP_S| within a region limited by ±a. This difference grows from zero to the maximum value and stays at the maximum value when the in-lane lateral position RP_S falls outside this region.

At step S505, the controller 50A provides, as an output, the control parameter θS_R, calculated at step S504, to the right-side actuator 710. At step S506, the controller 50A provides, as an output, the control parameter θS_L, calculated at step S504, to the left-side actuator 720. In response to commands from the controller 50A, the right- and left-side actuators 710 and 720 move the right and left side frames 712 and 722 in rotational directions, respectively, thus pressing the side portions 73a and 73b against the sides of the driver to transmit the lateral and longitudinal information to the driver.

Figure 25:
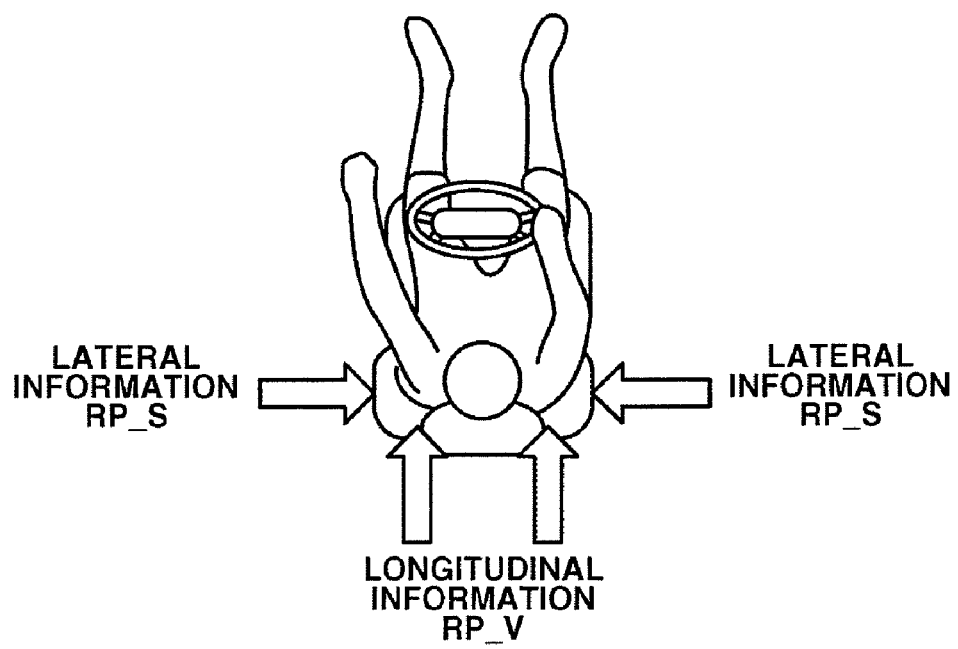
FIG. 25 is a diagram illustrating pieces of information to be transmitted to a driver via the driver's seat shown in FIG. 22.

Referring to FIG. 25, the fifth exemplary embodiment transmits the longitudinal information, that is, the risk potential RP_V, to the driver by pressure inputs via the side portion on the right 73a of the back rest 73 and the side portion on the left 73b of the back rest 73 to hold the driver. It also transmits the lateral information, that is, the in-lane lateral position RP_S indicative of a degree of approach to a lane boundary, to the driver by a difference between pressure inputs via the side portions 73a and 73b of the back rest 73 by pressing the side portion 73a or 73b near the lane boundary against the side of the driver more firmly than the other side portion 73b or 73a to create the difference between the pressure inputs.

In addition to the effects provided by the first exemplary embodiment, the fifth exemplary embodiment provides effects as follows:

(1) The driver assisting system 2 calculates, as the longitudinal information, a risk potential RP_V with regard to the preceding vehicle. The risk potential RP_V is calculated using a distance D to the preceding vehicle, a relative speed Vr to the preceding vehicle and a vehicle speed V of a host or own vehicle. Transmitting the risk potential RP_V to the driver via an haptic input via the seat 71 makes it possible for the driver to perceive the running conditions intuitively.

(2) The risk potential RP_V and the in-lane lateral position RP_S are transmitted to the driver by different, in magnitude, pressure inputs via the same portion of the seat 71. Applying different pressure inputs via the same portion of the seat is effective avoid complicated structure in transmitting different pieces of information to the driver. The risk potential RP_V is transmitted to the driver by pressure inputs to hold the driver via the side portions on the right and left 73a and 73b. The in-lane lateral position RP_S is transmitted to the driver by a difference between the pressure inputs via the side portions on the right and left 73a and 73b.

Sixth Exemplary Embodiment

Referring to FIGS. 21-22 and 26-29, the sixth exemplary embodiment of a driver assisting system according to the present invention is described. The sixth exemplary embodiment is substantially the same as the fifth exemplary embodiment shown in FIG. 21.

However, the sixth exemplary embodiment is different from the fifth exemplary embodiment in that it applies vibration inputs to a driver in response to the longitudinal information in the form of a risk potential RP_V with regard to the preceding vehicle via a side portion on the right 73a of a back rest 73 and a side portion on the left 73b of the back rest 73. The sixth exemplary embodiment causes the side portion on the right 73a or the side portion on the left 73b to swing in response to the lateral information in the form of an in-lane lateral position RP_S. In this exemplary embodiment, the vibration is produced via the side portions 73a and 73b by repeating reciprocal rotational movements of the side frames 712 and 722 within short stroke through activation of motors 711 and 721 of right- and left-side actuators 710 and 720.

Figure 26:
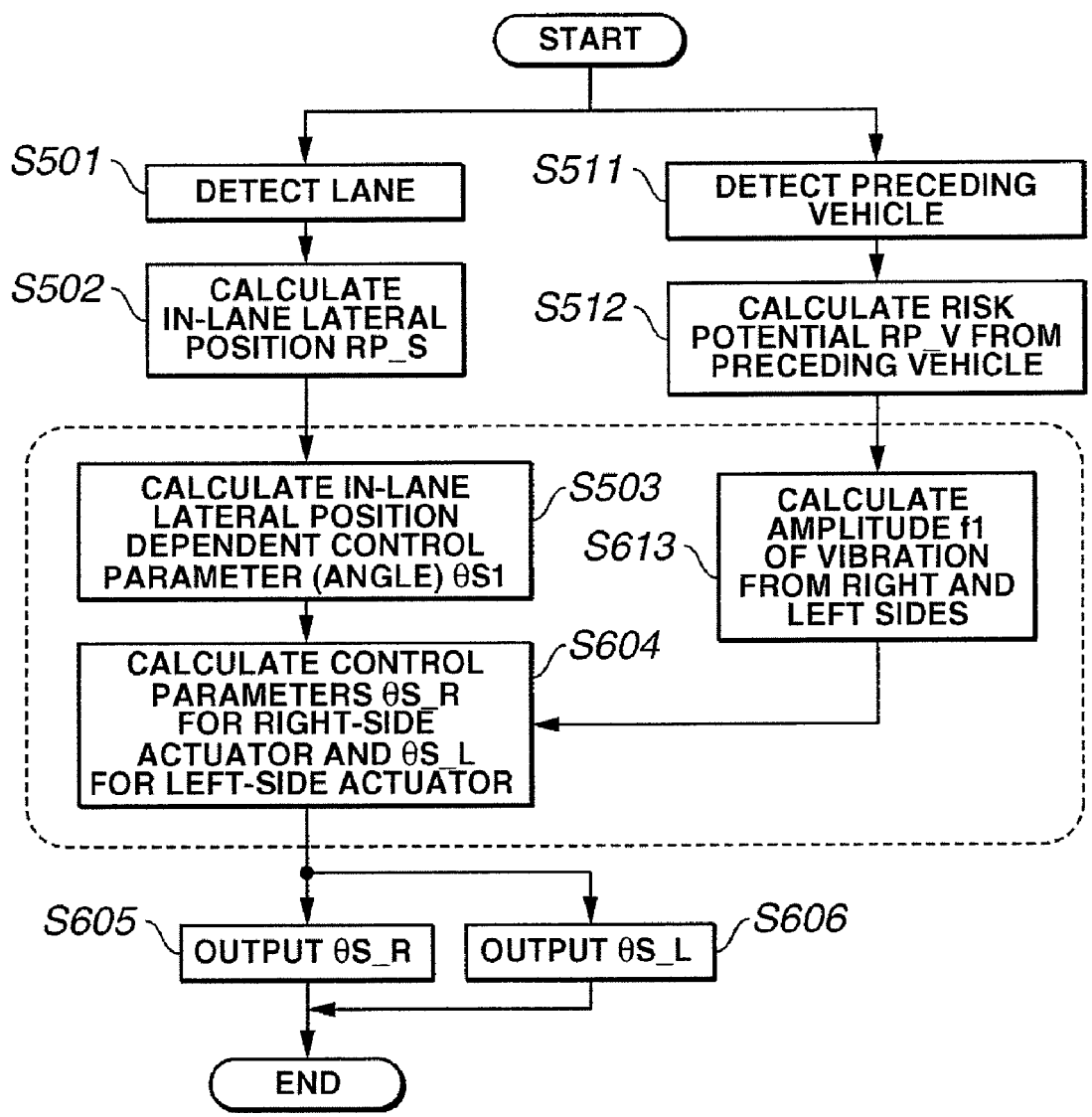
FIG. 26 is a flow chart illustrating the operation of a sixth exemplary embodiment.

Referring to FIG. 26, it is described below how the sixth exemplary embodiment operates. The flow chart in FIG. 26 illustrates a control program for assisting the driver. Execution of the control program is repeated at regular intervals of 50 milliseconds. The flow chart in FIG. 26 is substantially the same as the flow chart in FIG. 23. Like reference numerals are used to designate like steps throughout FIGS. 23 and 26. The flow charts 23 and 26 have steps S501, S502, S503, S511 and S512 in common.

Figure 27:
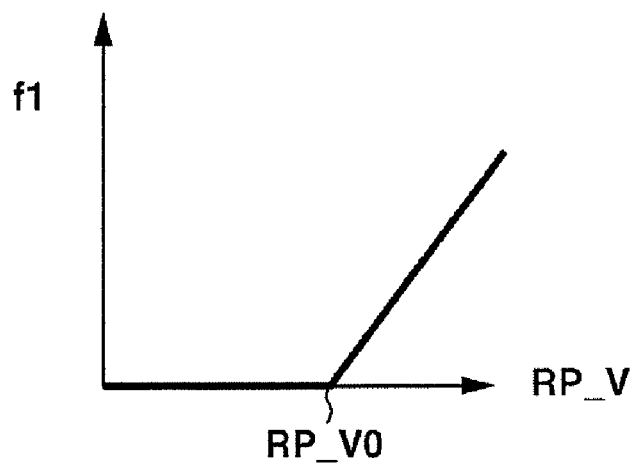
FIG. 27 is a graphical representation of varying of a vibration parameter f1 with different values of the risk potential RP_V.

In FIG. 26, at step S613, a controller 50A calculates a vibration parameter, in the form of an amplitude f1 of vibration via side portions 73a and 73b, based on the risk potential RP_V calculated at step S512. FIG. 27 illustrates varying of amplitude f1 of vibration with different values of risk potential RP_V. As shown in FIG. 27, the amplitude f1 is zero when the risk potential RP_V is less than or equal to a predetermined value RP_V0, and it increases as the risk potential RP_V exceeds the predetermined value RP_V0.

At the next step S604, the controller 50A calculates a control parameter θS_R for the right-side actuator 710 and a control parameter θS_L for the left-side actuator 720 using the in-lane lateral position RP_S dependent control parameter θS1 (calculated at step S503) and the amplitude f1 of vibration calculated at step S613 based on the risk potential RP_V.

If the vehicle is traveling in close to the lane boundary on the right (RP_S≧0), the control parameters θS_R and θS_L are given by:

$$\theta S\_R = \theta S1 + f1$$

$$\theta S\_L = f1 \quad \text{(Eq. 18)}$$

If the vehicle is traveling in close to the lane boundary on the left (RP_S<0), the control parameters θS_R and θS_L are given by:

$$\theta S\_R = f1$$

$$\theta S\_L = \theta S1 + f1 \quad \text{(Eq. 19)}$$

Figure 28:
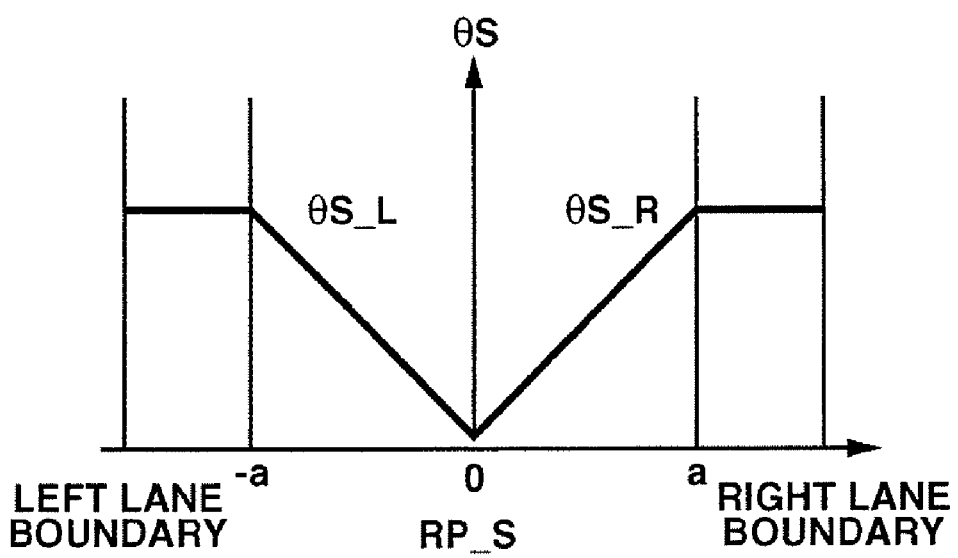
FIG. 28 is a graphical representation of varying of a control parameter θS1 and a control parameter θS2 with different values of an in-lane lateral position RP_S.

Referring to FIG. 28, the fully drawn line illustrates varying of the control parameters θS_R and θS_L for the right- and left-side actuators 710 and 720 with different values of the in-lane lateral position RP_S. When the host vehicle is traveling on one half lane on the right (RP_S≧0), the control parameter θS_R for the right-side actuator 710 is equal to θS1+f1 (pressure input+vibration input), and the control parameter θS_L for the left-side actuator 720 is equal to f1 (vibration input only). When the host vehicle is traveling on the other half lane on the left (RP_S<0), the control parameter θS_R for the right-side actuator 710 is equal to f1 (vibration input only), and the control parameter θS_L for the left-side actuator 720 is equal to θS1+f1 (pressure input+vibration input). Accordingly, a pressure input corresponding to the in-lane lateral position RP_S is produced via the side portion on the right 73a or side portion on the left 73b, and vibration inputs corresponding to the risk potential RP_V are produced via both of side portions 72a and 73b.

At step S605, the controller 50A provides, as an output, the control parameter θS_R, calculated at step S604, to the right-side actuator 710. At step S606, the controller 50A provides, as an output, the control parameter θS_L, calculated at step S604, to the left-side actuator 720. In response to commands from the controller 50A, the right- and left-side actuators 710 and 720 move the right and left side frames 712 and 722 in rotational directions, respectively, thus producing a pressure input via one of the side portions 73a and 73b to transmit the lateral information to the driver, and producing vibration inputs via both of the side portions 73a and 73b to transmit the longitudinal information to the driver.

Figure 29:
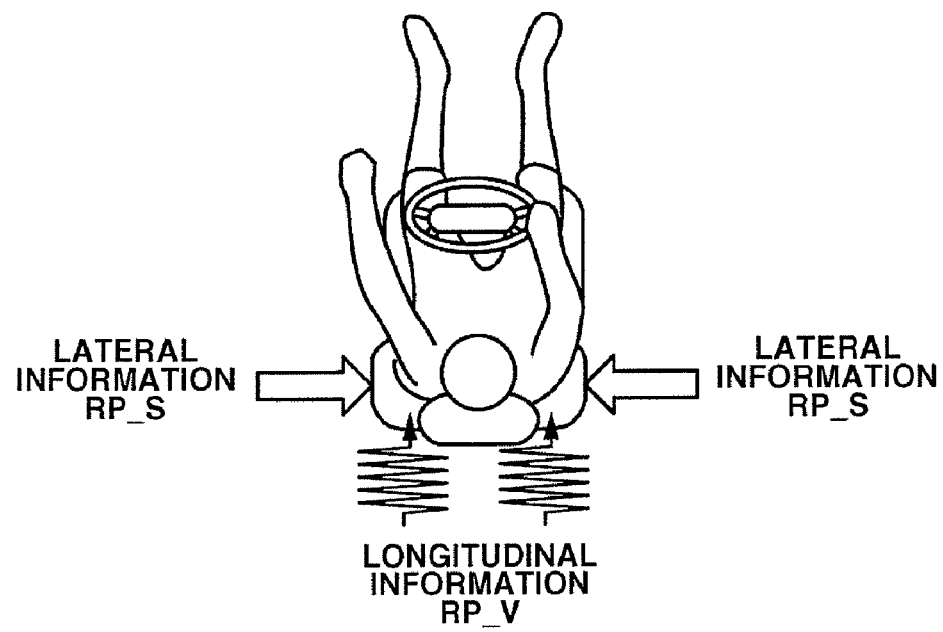
FIG. 29 is a diagram illustrating pieces of information to be transmitted to a driver via the driver's seat shown in FIG. 22.

Referring to FIG. 29, the sixth exemplary embodiment transmits the longitudinal information, that is, the risk potential RP_V, to the driver by vibration inputs via the side portion on the right 73a of the back rest 73 and the side portion on the left 73b of the back rest 73. It also transmits the lateral information, that is, the in-lane lateral position RP_S indicative of a degree of approach to a lane boundary, to the driver by a pressure input via one of the side portions 73a and 73b of the back rest 73.

In addition to the effects provided by the fifth exemplary embodiment, the sixth exemplary embodiment provides an effect as follows:

The risk potential RP_V and the in-lane lateral position RP_S are transmitted to the driver by different, in form, haptic inputs via the same portion of the seat. The risk potential RP_V is transmitted to the driver by a vibration input via the side portions on the right and left 73a and 73b, while the in-lane lateral position RP_S is transmitted to the driver by a difference between pressure inputs via the side portions on the right 73a and 73b. The driver can easily perceive a degree of approach to the adjacent lane boundary by the difference between the pressure inputs via the side portions on the right and left 73a and 73b.

Seventh Exemplary Embodiment

Referring to FIGS. 21-22 and 30-34, the seventh exemplary embodiment of a driver assisting system according to the present invention is described. The seventh exemplary embodiment is substantially the same as the fifth exemplary embodiment shown in FIG. 21.

Figure 30:
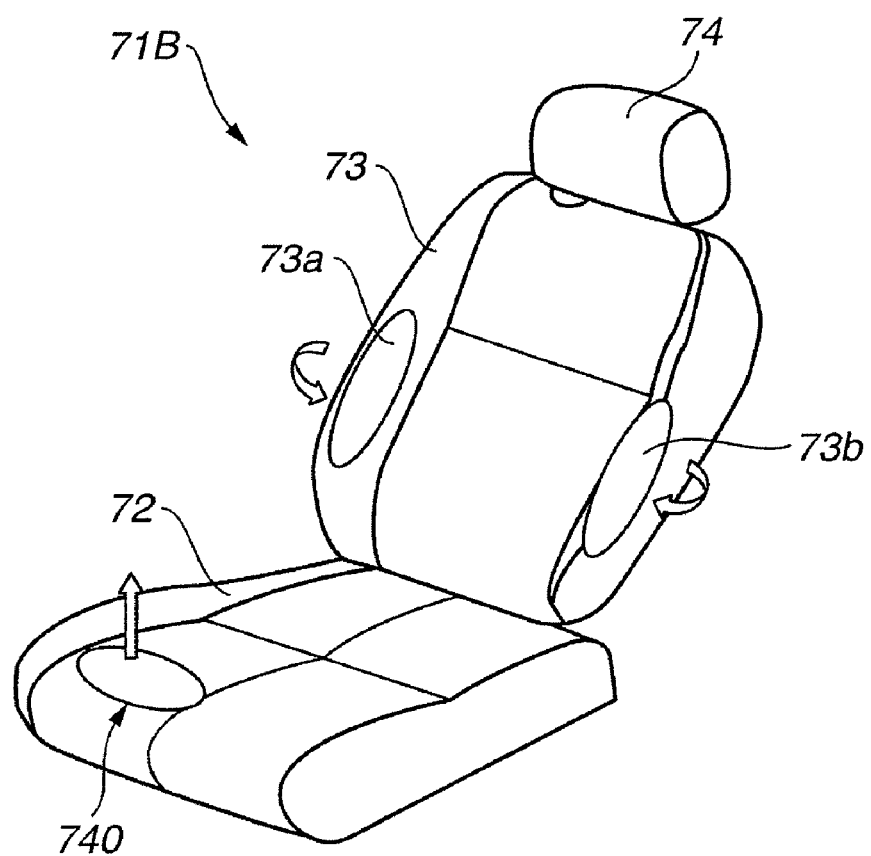
FIG. 30 is a perspective view of a driver's seat illustrating a seventh exemplary embodiment.

However, the seventh exemplary embodiment is different from the fifth exemplary embodiment in that, in addition to the right- and left side actuators 710 and 720 of the seat driver mechanism 70A (see FIG. 21), a seat driver mechanism 71B in the seventh exemplary embodiment is provided with a cushion front portion actuator 740 as shown in FIG. 30. This actuator 740 regulates pressure within an air bag embedded into a cushion portion 72 at a front right area supporting the rear of femoral region of a right leg of a driver to produce a pressure input to the driver.

In the seventh exemplary embodiment, a pressure input responsive to the longitudinal information in the form of a risk potential RP_V with regard to the preceding vehicle in front is produced via the front right area of the cushion portion 72. One of the side portions 73a and 73b swings in response to the lateral information in the form of an in-lane lateral position RP_S.

Figure 31:
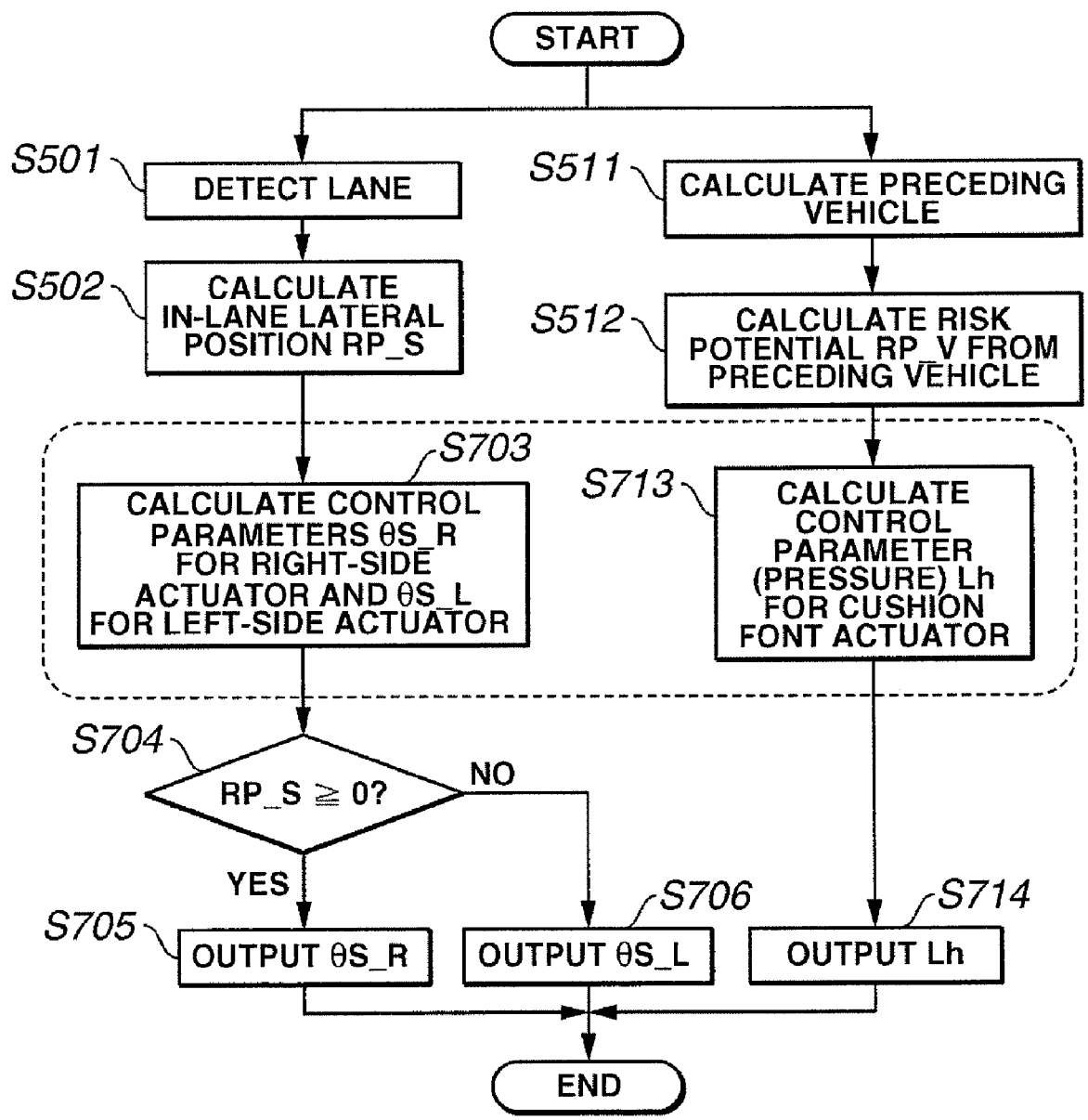
FIG. 31 is a flow chart illustrating the operation of the seventh exemplary embodiment.

Referring to FIG. 31, it is described below how the seventh exemplary embodiment operates. The flow chart in FIG. 31 illustrates a control program for assisting the driver. Execution of the control program is repeated at regular intervals of 50 milliseconds. The flow chart in FIG. 31 is substantially the same as the flow chart in FIG. 23. Like reference numerals are used to designate like steps throughout FIGS. 23 and 31. The flow charts in FIGS. 23 and 31 have steps S501, S502, S511 and S512 in common.

In FIG. 31, at step S703, a controller 50A calculates a control parameter θS_R for the right-hand actuator 710 and a control parameter θS_L for the left-hand actuator 720 based on the in-lane lateral position RP_S calculated at step S502.

Figure 32:
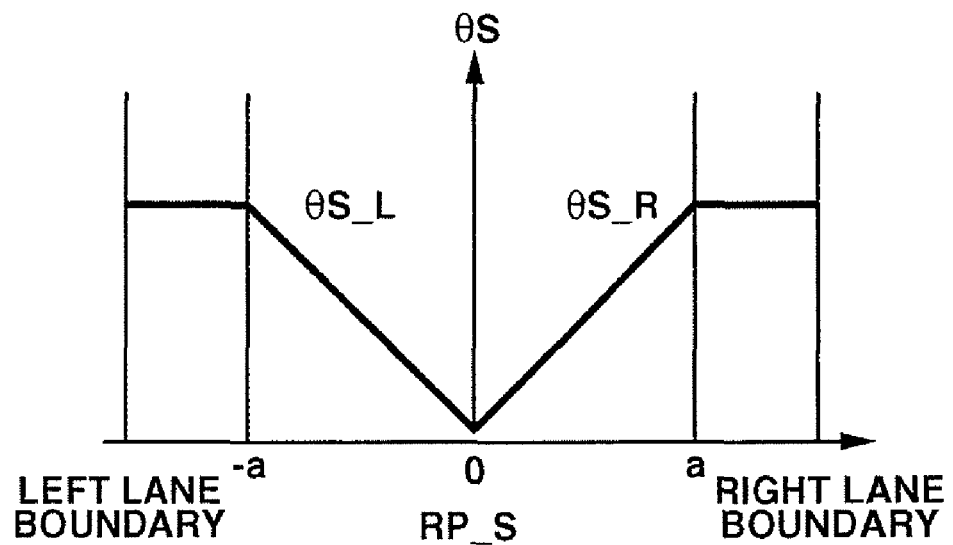
FIG. 32 is a graphical representation of varying of a control parameter θS1 and a control parameter θS2 with different values of an in-lane lateral position RP_S.

The fully drawn line in FIG. 32 illustrates varying of the control parameter θS_R and θS_L with different values of the in-lane lateral position RP_S. In FIG. 32, the control parameters θS_R and θS_L for the right- and left-side actuators 710 and 720 are generally denoted by θS. If the in-lane lateral position RP_S falls in a predetermined range (−a≦RP_S≦a) including the centerline, the control parameter θS is calculated from the following equation:

$$\theta S = Ks \cdot |RP\_S| \quad \text{(Eq. 20)}$$

In the equation Eq. 20, the coefficient Ks is a predetermined value. If the in-lane lateral position RP_S falls outside of the predetermined range± a indicating that the host vehicle has approached one of the lane boundaries, the control parameter θS is fixed.

At step S704, the controller 50A determines the sigh of the in-lane lateral position RP_S calculated at step S502. If the in-lane lateral position RP_S is greater than or equal to 0 (RP_S≧0), that is, if the host vehicle is traveling within the lane at the right half region, the program proceeds to step S705. At step S705, the controller 50A provides, as an output, the control parameter θS_R, calculated at step S104, to the right-side actuator 710. If, at step S704, the in-lane lateral position RP_S is less than 0 (RP_S<0), that is, if the host vehicle is traveling within the lane at the left half region, the program proceeds to step S706. At step S706, the controller 50A provides, as an output, the control parameter θS_L, calculated at step S703, to the left-side actuator 720.

Figure 33:
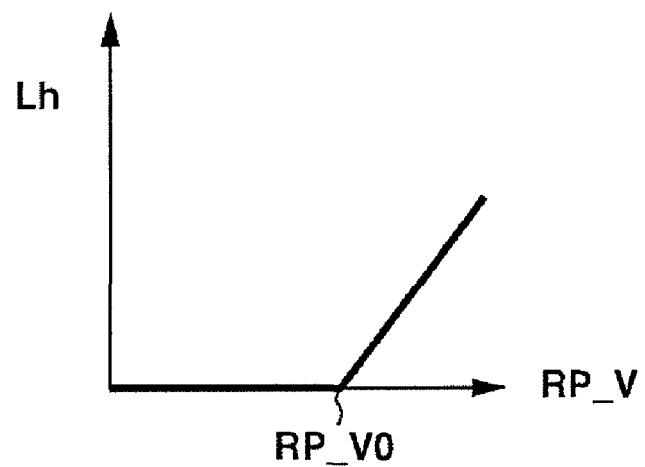
FIG. 33 is a graphical representation of varying of a cushion front portion control parameter Lh with different values of the risk potential RP_V.

At step S713, the controller 50A calculates the control parameter Lh for the cushion front portion actuator 740, that is, an internal pressure within the air bag, based on the risk potential RP_V calculated at step S512 with regard to the preceding vehicle. FIG. 33 illustrates varying of the control parameter Lh with different values of risk potential RP_V. As shown in FIG. 33, the control parameter Lh is zero when the risk potential RP_V is less than or equal to a predetermined value RP_V0, and it increases when the risk potential RP_V exceeds the predetermined value RP_V0.

At step S714, the controller 50A provides, as an output, the control parameter Lh calculated at step S713 to the cushion front portion actuator 740.

In response to commands from the controller 50A, the right- and left-side actuators 710 and 720 move the right and left side frames 712 and 722 in rotational directions, respectively, thus transmitting the lateral information by a pressure input via one of side portions 73a and 73b. The longitudinal information is transmitted to the driver by a pressure input via the front right area of the cushion portion 72. Execution of the program ends immediately after one of the steps S705, S706 and S714.

Figure 34:
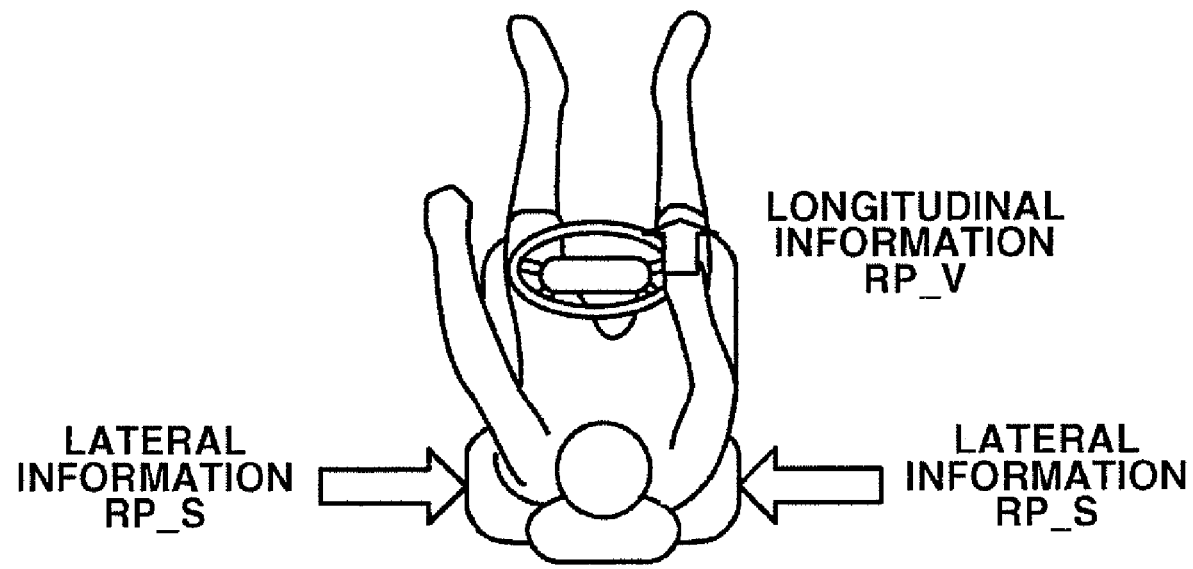
FIG. 34 is a diagram illustrating pieces of information to be transmitted to a driver via the driver's seat shown in FIG. 30.

Referring to FIG. 34, the seventh exemplary embodiment transmits the longitudinal information in the form of the risk potential RP_V to the driver via a pressure input to the rear of femoral region of the right leg of the driver via the front right area of the cushion portion. The seventh exemplary embodiment transmits the lateral information in the form of a degree of approach to a lane boundary by a pressure input to the side of the driver near the lane boundary which the vehicle is approaching.

In addition to the effects provided by the fifth exemplary embodiment, the seventh exemplary embodiment provides an effect as follows:

The risk potential RP_V and the in-lane lateral position RP_S are transmitted to the driver by pressure inputs via different portions of the seat. The in-lane lateral position RP_S is transmitted to the driver by a pressure input via one of side portions on the right and left 73a and 73b, while the risk potential RP_V is transmitted to the driver by a pressure input via a front right area within the cushion portion 72 supporting the rear femoral of a right leg of the driver. Separating portions via which the longitudinal and lateral information makes it possible for the driver to recognize pieces of information separately and clearly. Transmitting the longitudinal information to the driver by applying a haptic input to the rear of femoral of the right leg of the driver makes it easy for the driver to quickly recognize that deceleration operation is imminent.

Eighth Exemplary Embodiment

Referring to FIGS. 21-22 and 35-36, the eighth exemplary embodiment of a driver assisting system according to the present invention is described. The eighth exemplary embodiment is substantially the same as the fifth exemplary embodiment shown in FIG. 21.

However, the eighth exemplary embodiment is different from the fifth exemplary embodiment in that, in addition to the right- and left side actuators 710 and 720 of the seat driver mechanism 70A (see FIG. 21), a seat driver mechanism in the eighth exemplary embodiment is provided with a middle actuator 730 in a manner similar to the first exemplary embodiment shown in FIGS. 1, 3 and 4. The middle actuator 730 is provided to activate a middle portion 73c of a back rest 73 (see FIGS. 3 and 4).

The eighth exemplary embodiment transmits the longitudinal information in the form of a risk potential RP_V with regard to the preceding vehicle by a pressure input via the middle portion 73c of the back rest 73. The eighth exemplary embodiment transmits the lateral information in the form of an in-lane lateral position RP_S to the driver by a pressure input via one of side portions on the right and left 73a and 73b by causing the one side portion to swing.

Figure 35:
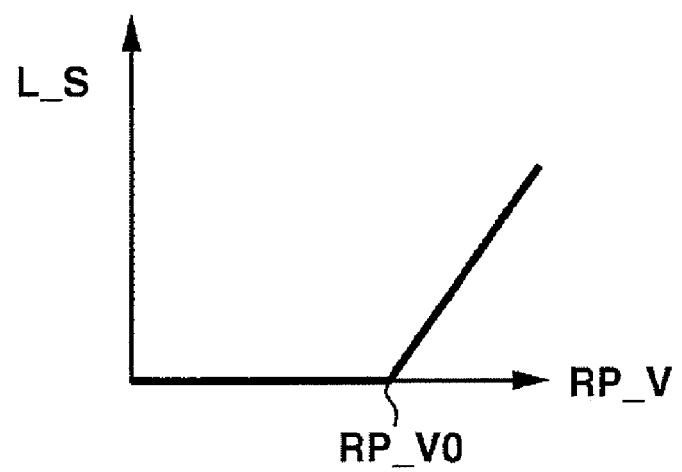
FIG. 35 is a graphical representation of varying of a middle portion control parameter L_S with different values of the risk potential RP_V, illustrating an eighth exemplary embodiment.

FIG. 35 illustrates varying of a control parameter L_S for the middle actuator 730 with different values of the risk potential RP_V. The control parameter L_S is indicative of an amount by which a seat back or back rest plate 732 (see FIG. 4) is pressed forwardly due to activation of the middle actuator 730. As shown in FIG. 35, the control parameter L_S is zero when the risk potential RP_V is less than or equal to a predetermined value RP_V0, and it increases when the risk potential RP_V exceeds the predetermined value RP_V0. In the eighth exemplary embodiment, FIG. 32 illustrates varying of the control parameters θS_R and θS_L for the right- and left-hand actuators 710 and 720 with different values of the in-lane lateral position RP_S.

Figure 36:
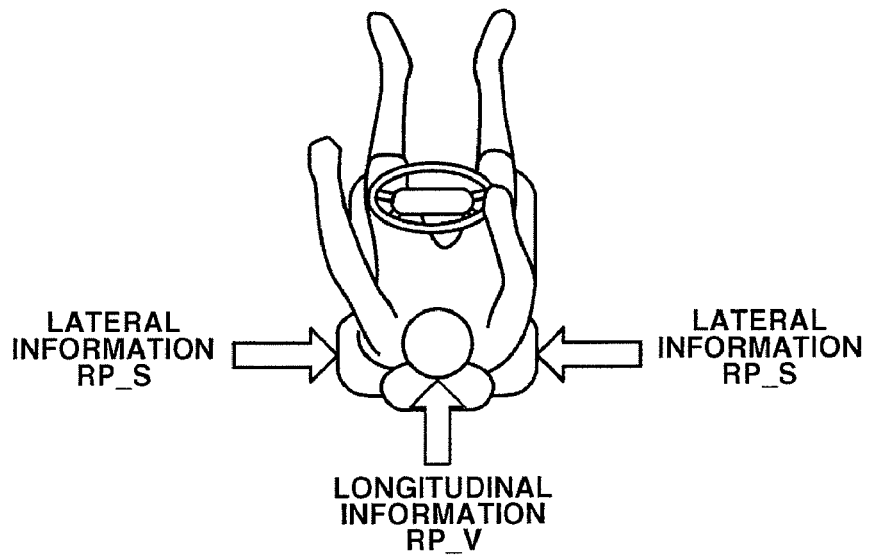
FIG. 36 is a diagram illustrating pieces of information to be transmitted to a driver via the driver's seat shown in FIGS. 3 and 4.

Referring to FIG. 36, the eighth exemplary embodiment transmits the longitudinal information in the form of risk potential RP_V with regard to the preceding vehicle to the driver at a lumbar by a pressure input via the middle portion 73c of the back rest 73 (see FIGS. 3 and 4). The eighth exemplary embodiment transmits the lateral information to the driver at one of sides by a pressure input via one of side portions on the right and left 73a and 73b (see FIGS. 3 and 4).

The eighth exemplary embodiment provides substantially the same effect as the seventh exemplary embodiment does even though the eighth exemplary embodiment produces a pressure input response to the risk potential RP_V with regard to the preceding vehicle via the middle portion 73c of he back rest 73. As the driver is pushed forwardly by the pressure input to the lumbar via the middle portion 73c of the back rest 73, the driver feels as if the vehicle travels at a speed higher than the actual vehicle speed V. Such amplification in running environment prompts the driver to quickly shift to driving operation to avoid future risk.

Ninth Exemplary Embodiment

Referring to FIGS. 21-22 and 37-39, the ninth exemplary embodiment of a driver assisting system according to the present invention is described. The ninth exemplary embodiment is substantially the same as the fifth exemplary embodiment shown in FIG. 21.

However, the ninth exemplary embodiment is different from the fifth exemplary embodiment in that, in addition to the right- and left side actuators 710 and 720 of the seat driver mechanism 70A (see FIG. 21), a seat driver mechanism in the ninth exemplary embodiment is provided with a middle actuator 730 in a manner similar to the first exemplary embodiment shown in FIGS. 1, 3 and 4. The middle actuator 730 is provided to activate a middle portion 73c of a back rest 73 (see FIGS. 3 and 4). This ninth exemplary embodiment and the previously described eighth exemplary embodiment are substantially the same. Thus, a difference from the eighth exemplary embodiment only is described below.

According to the eighth exemplary embodiment, a pressure input is produced via the middle portion 73c of the back rest 73 to transmit the longitudinal information in the form of the risk potential RP_V to the driver. According to the ninth exemplary embodiment, a vibration input is produced via the middle portion 73c of the back rest 73 to transmit the longitudinal information in the form of the risk potential RP_V to the driver. The vibration is produced by repeating reciprocating motion of the middle actuator 730 quickly. The ninth exemplary embodiment transmits the lateral information in the form of the in-lane lateral position RP_S to the driver by a pressure input via one of side portions on the right and left 73a and 73b.

Figure 37:
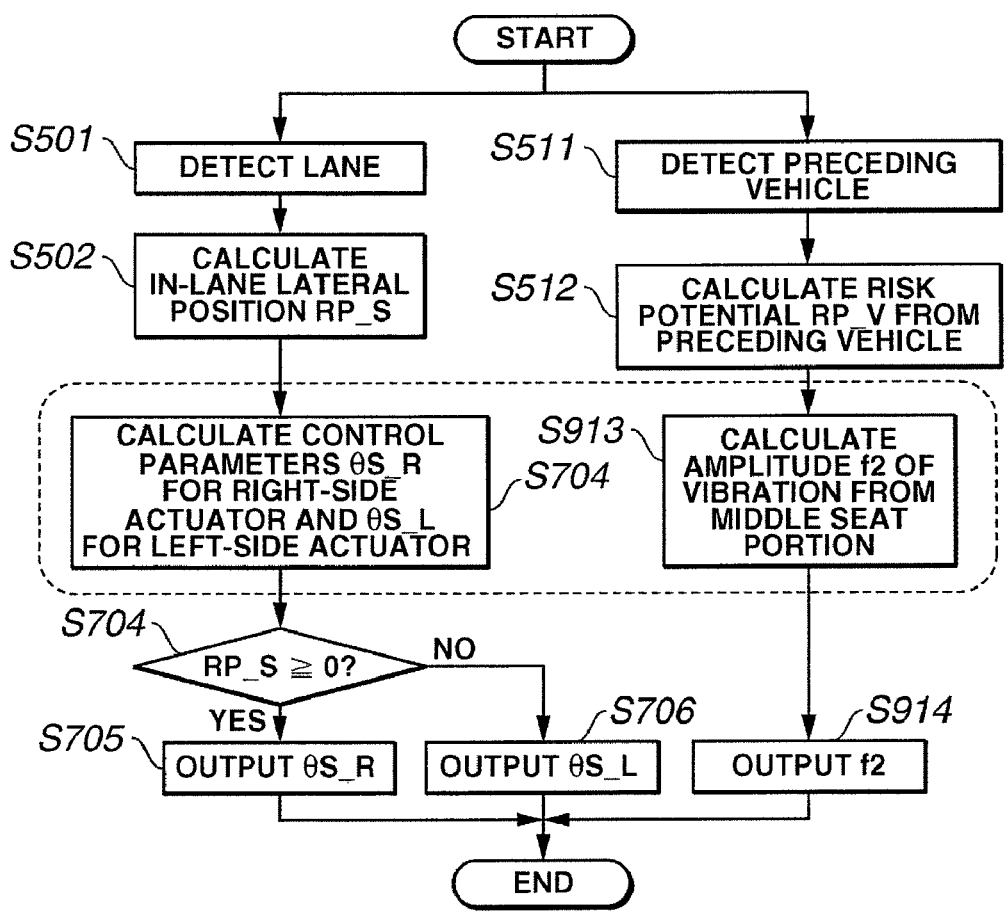
FIG. 37 is a flow chart illustrating the operation of a ninth exemplary embodiment.

Referring to FIG. 37, it is described below how the ninth exemplary embodiment operates. The flow chart in FIG. 37 illustrates a control program for assisting the driver. Execution of the control program is repeated at regular intervals of 50 milliseconds. The flow chart in FIG. 37 is substantially the same as the flow chart in FIG. 31. Like reference numerals are used to designate like steps throughout FIGS. 31 and 37. The flow charts in FIGS. 31 and 37 have steps S501, S502, S511, S512, S703, S704, S705 and S706 in common. The flow chart in FIG. 37 is different from the flow chart in FIG. 31 in that, instead of the steps S713 and S714, new steps S913 and S914 are provided.

Figure 38:
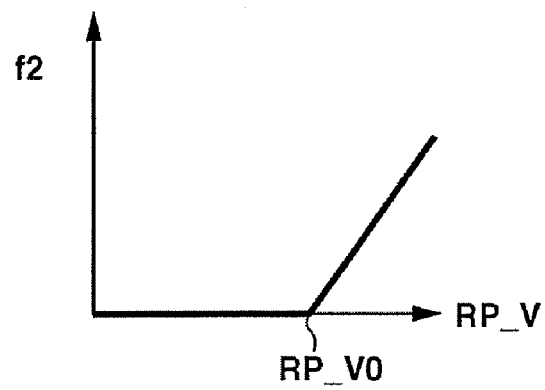
FIG. 38 is a graphical representation of varying of a vibration parameter f2 with different values of the risk potential RP_V.

In FIG. 37, at step S913, a controller 50A calculates a vibration parameter in the form of an amplitude f2 of vibration to be produced via a middle portion 73c of a back rest 73 based on the risk potential RP_V calculated at step S512 with regard to the preceding vehicle. FIG. 38 illustrates varying of the amplitude f2 of vibration with different values of risk potential RP_V. As shown in FIG. 38, the amplitude f2 of vibration is zero when the risk potential RP_V is less than or equal to a predetermined value RP_V0, and it increases when the risk potential RP_V exceeds the predetermined value RP_V0.

At step S914, the controller 50A provides, as an output, the amplitude f2 of vibration calculated at step S913 to the middle actuator 730.

In response to commands from the controller 50A, the right- and left-side actuators 710 and 720 move the right and left side frames 712 and 722 in rotational directions, respectively, thus transmitting the lateral information by a pressure input via one of side portions 73a and 73b. The longitudinal information is transmitted to the driver by a vibration input via the middle portion 73c of the back rest 73. Execution of the program ends immediately after one of the steps S705, S706 and S914.

Figure 39:
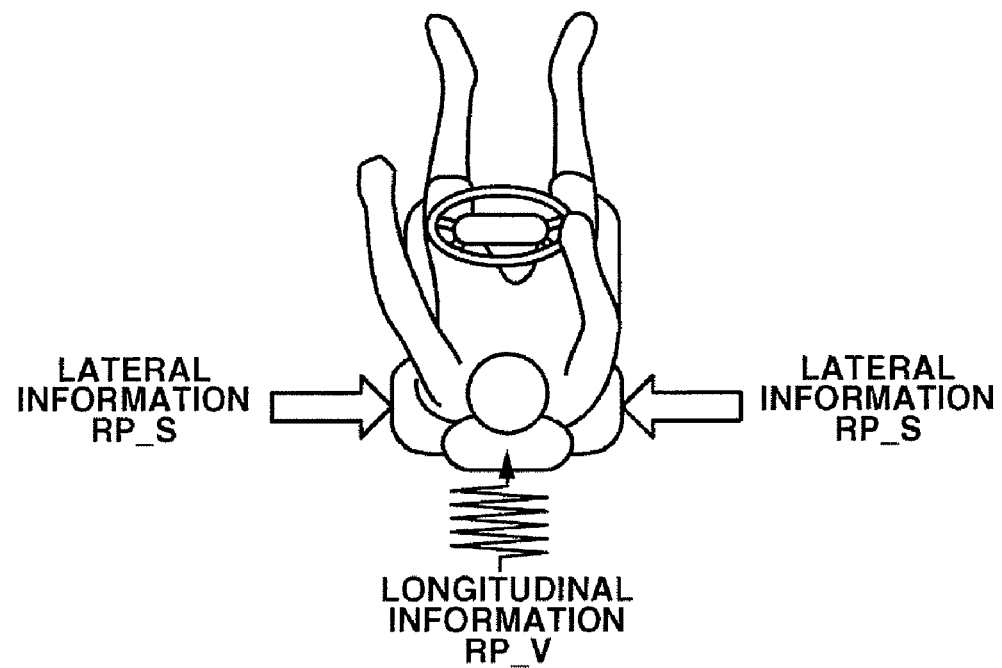
FIG. 39 is a diagram illustrating pieces of information to be transmitted to a driver via the driver's seat shown in FIGS. 3 and 4.
Figure 40:
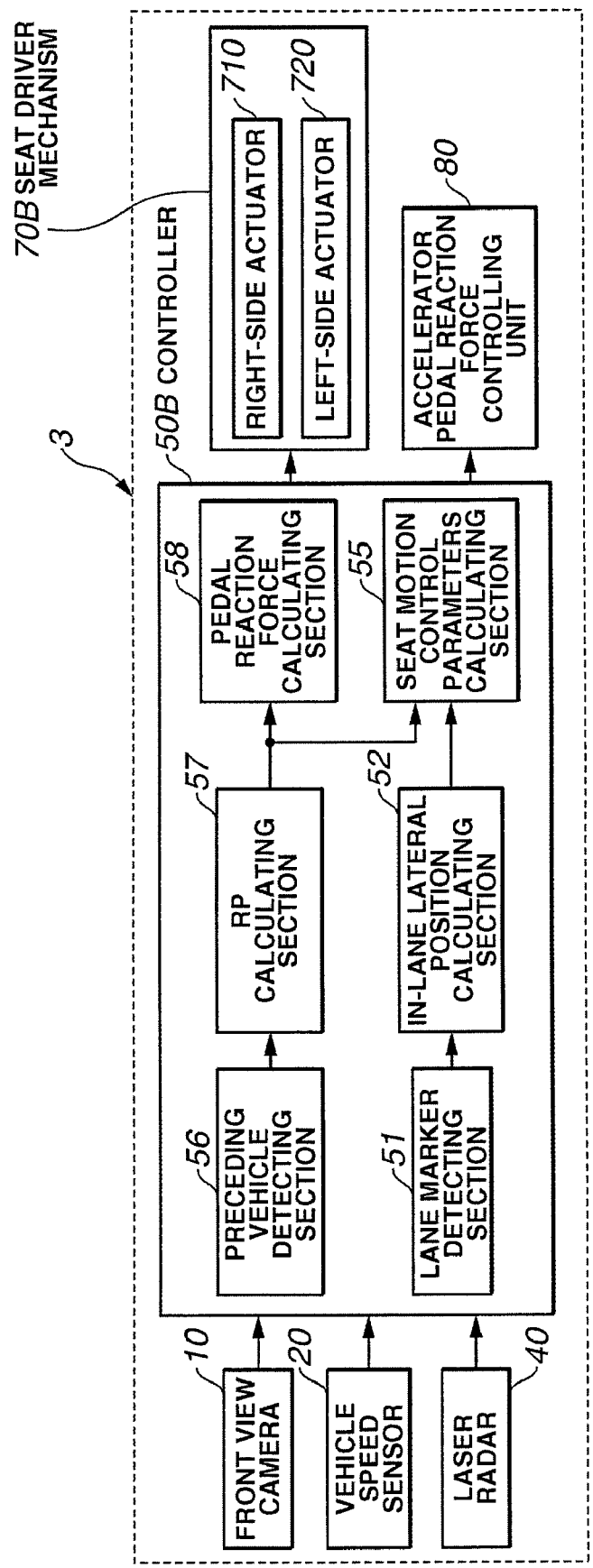
FIG. 40 is a block diagram illustrating a tenth exemplary embodiment of a driver assisting system according to the present invention.

Referring to FIG. 39, the ninth exemplary embodiment transmits the longitudinal information in the form of the risk potential RP_V with regard to the preceding vehicle to the driver at the lumbar by a vibration input via the middle portion 73c of the back rest 73. The ninth exemplary embodiment transmits the lateral information in the form of the in-lane lateral position RP_S to the driver at the one side near a lane boundary which the vehicle is approaching by a pressure input via one of side portions on the right and left 73a and 73b near the lane boundary.

In addition to the effects provided by the fifth exemplary embodiment, the ninth exemplary embodiment provides an effect as follows:

The risk potential RP_V and the in-lane lateral position RP_S are transmitted to the driver by different, in form, haptic inputs via different portions of the seat. The risk potential RP_V is transmitted to the driver by a vibration input via the middle portion 73c of the back rest 73. The in-lane lateral position RP_S is transmitted to the driver by a pressure input via one of side portions on the right and left 73a and 73b. This makes it easy for the driver to clearly and separately recognize pieces of information.

Tenth Exemplary Embodiment

Referring to FIGS. 21-22 and 40-45, the tenth exemplary embodiment of a driver assisting system 3 according to the present invention is described. The tenth exemplary embodiment is substantially the same as the fifth exemplary embodiment shown in FIG. 21. Like reference numerals are used to designate like parts, portions and steps throughout FIGS. 21-22 and 40-45.

The tenth exemplary embodiment is different from the fifth exemplary embodiment in that, in addition to the lane marker detecting section 51, in-lane lateral position calculating section 52, preceding vehicle detecting section 56, risk potential (RP) calculating section 57 and seat motion control parameters calculating section 55, a controller 50B of the driver assisting system 3 is provided a pedal reaction force calculating section 58, and an accelerator pedal reaction force controlling unit 80 is newly provided.

The controller 50B calculates, at the risk potential calculating section 57, calculates a first risk potential RP_Vttc with regard to the preceding vehicle as the reciprocal of a time to collision TTC expressed by the equation Eq. 12 (RP_Vttc=1/TTC), and a second risk potential RP_Vthw with regard to the preceding vehicle as the reciprocal of a time headway THW expressed by the equation Eq. 13 (RP_Vthw=1/THW). The first risk potential RP_Vttc is a value of risk variable dependent upon a transient change in running state between the host vehicle and the preceding vehicle in front. The second risk potential RP_Vthw is a value of stable risk calculated from the current running state between the host vehicle and the preceding vehicle in front.

The pedal reaction force calculating section 58 calculates an accelerator pedal reaction force based on the risk potential calculated at the risk potential calculating section 57. The accelerator pedal reaction force controlling unit 80 is provided with a servo motor incorporated into a link mechanism to an accelerator pedal, and regulates a reaction force via the accelerator pedal by driving the servo motor in response to a command from the controller 50B.

The tenth exemplary embodiment transmits the lateral information in the form of the in-lane lateral position RP_S to the sides of a driver by a difference between pressure inputs via the side portions on the right and left 73a and 73b. The tenth exemplary embodiment transmits the longitudinal information in the form of the second risk potential RP_Vthw to the sides of the driver by pressure inputs to hold the driver via the side portions on the right and left 73a and 73b. Further, the tenth exemplary embodiment transmits the first risk potential RP_Vttc to the driver by a reaction force input via the accelerator pedal.

Figure 41:
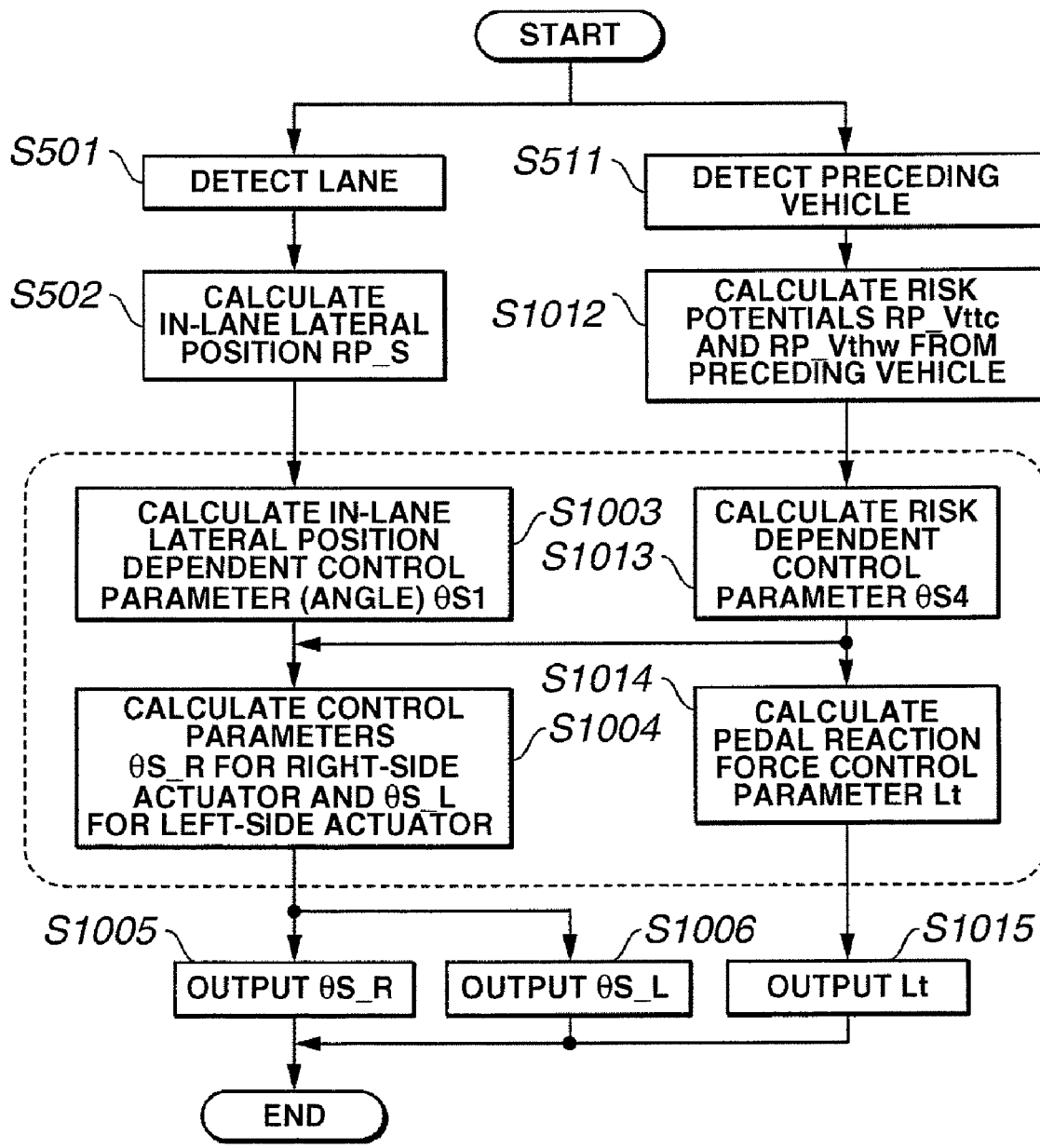
FIG. 41 is a flow chart illustrating the operation of the tenth exemplary embodiment.

Referring to FIG. 41, it is described below how the tenth exemplary embodiment operates. The flow chart in FIG. 41 illustrates a control program for assisting the driver. Execution of the control program is repeated at regular intervals of 50 milliseconds. The flow chart in FIG. 41 is substantially the same as the flow chart in FIG. 23. Like reference numerals are used to designate like steps throughout FIGS. 23 and 41. The flow charts in FIGS. 23 and 41 have steps S501, S502 and S511 in common. Besides, step S1003 in FIG. 41 corresponds to step S503 in FIG. 23, and steps S1005 and S1006 in FIG. 41 correspond to step S505 and S506 in FIG. 23. The flow chart in FIG. 41 is different from the flow chart in FIG. 23 in that, instead of the steps S512, S513 and S504, new steps S1012, S1013 and S1004 are provided. Besides, the flow chart in FIG. 41 has new steps S1014 and S1015.

In FIG. 41, at step S1012, the controller 50B calculates the time to collision TTC and time headway THW using the equations Eq. 12 and Eq. 13, respectively, and calculates the first risk potential RP_Vttc as the reciprocal of TTC and the second risk potential RP_Vthw as the reciprocal of THW.

At step S1013, the controller 50B calculates a control parameter θS4 based on the second risk potential RP_Vthw. The control parameter θS4 is calculated using the following equation:

$$\theta S4 = Kw \cdot RP\_Vthw - C1 \quad \text{(Eq. 21)}$$

where: Kw is a predetermined appropriate coefficient; and C1 is a predetermined appropriate constant.

Figure 42:
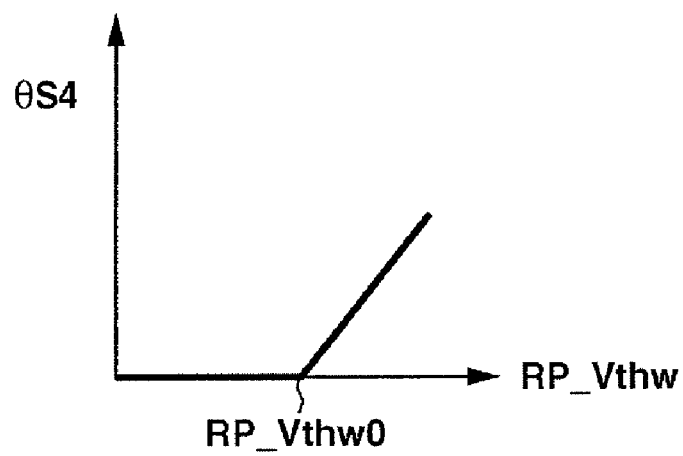
FIG. 42 is a graphical representation of varying of a risk dependent control parameter θS4 with different values of the risk potential RP_Vthw.

FIG. 42 illustrates varying of the control parameter θS4 with different values of the second risk potential RP_Vthw. As shown in FIG. 42, the control parameter θS4 is zero when the second risk potential RP_Vthw is less than or equal to a predetermined value RP_Vthw0, and it increases as the second risk potential RP_Vthw exceeds the predetermined value RP_Vthw0.

At the next step S1004, the controller 50B calculates a control parameter θS_R for the right-side actuator 710 and a control parameter θS_L for the left-side actuator 720 using the in-lane lateral position RP_S dependent control parameter θS1 (calculated at step S1003) and the control parameter θS4 calculated at step S1013 based on the second risk potential RP_Vthw.

If the vehicle is traveling in close to the lane boundary on the right (RP_S≧0), the control parameters θS_R and θS_L are given by:

$$\theta S\_R = \theta S1 + \theta S4$$

$$\theta S\_L = \theta S4 \quad \text{(Eq. 22)}$$

If the vehicle is traveling in close to the lane boundary on the left (RP_S<0), the control parameters θS_R and θS_L are given by:

$$\theta S\_R = \theta S4$$

$$\theta S\_L = \theta S1 + \theta S4 \quad \text{(Eq. 23)}$$

Figure 43:
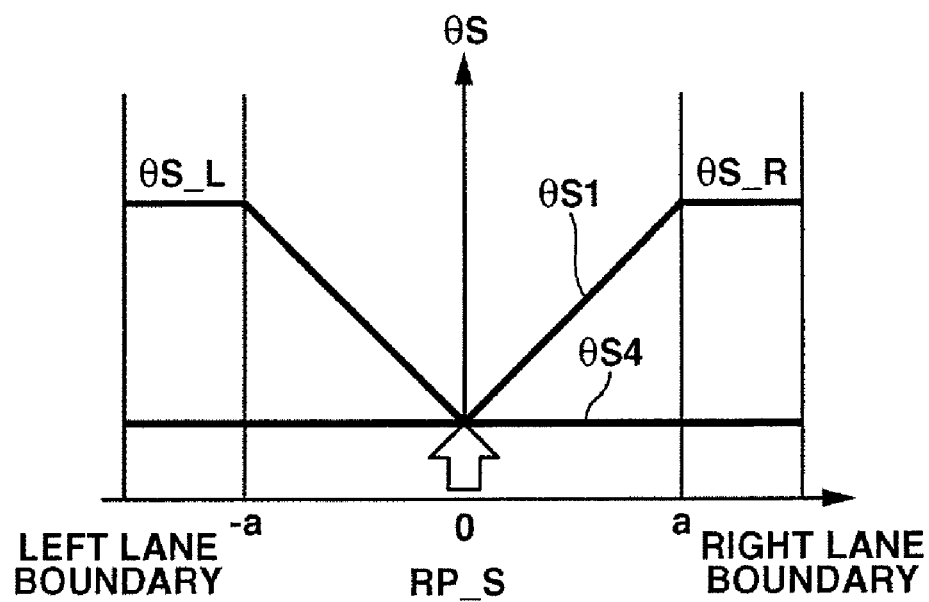
FIG. 43 is a graphical representation of varying of the sum of a control parameter θS1 and the risk dependent control parameter θS4 with different values of an in-lane lateral position RP_S.

Referring to FIG. 43, the fully drawn line illustrates varying of the control parameters θS_R and θS_L for the right- and left-side actuators 710 and 720 with different values of the in-lane lateral position RP_S. When the host vehicle is traveling on one half lane on the right (RP_S≧0), the control parameter θS_R for the right-side actuator 710 is equal to θS1+θS4, and the control parameter θS_L for the left-side actuator 720 is equal to θS4. When the host vehicle is traveling on the other half lane on the left (RP_S<0), the control parameter θS_R for the right-side actuator 710 is equal to θS4, and the control parameter θS_L for the left-side actuator 720 is equal to θS1+θS4.

At step S1005, the controller 50B provides, as an output, the control parameter θS_R, calculated at step S1004, to the right-side actuator 710. At step S1006, the controller 50B provides, as an output, the control parameter θS_L, calculated at step S1004, to the left-side actuator 720. In response to commands from the controller 50B, the right- and left-side actuators 710 and 720 move the right and left side frames 712 and 722 in rotational directions, respectively, thus transmitting the lateral information to the driver by a difference between pressure inputs via the side portions 73a and 73b, and transmitting the longitudinal information to the driver by pressure inputs to hold the driver via the side portions 73a and 73b.

At step S1014, the controller 50B calculates an accelerator pedal reaction force control parameter Lt based on the first risk potential RP_Vttc calculated at step S1012. The accelerator pedal reaction force control parameter Lt is calculated using the following equation:

$$Lt = Kt \cdot RP\_Vttc - C2 \quad \text{(Eq. 24)}$$

where: Kt is a predetermined appropriate coefficient; and C2 is a predetermined appropriate constant.

Figure 44:
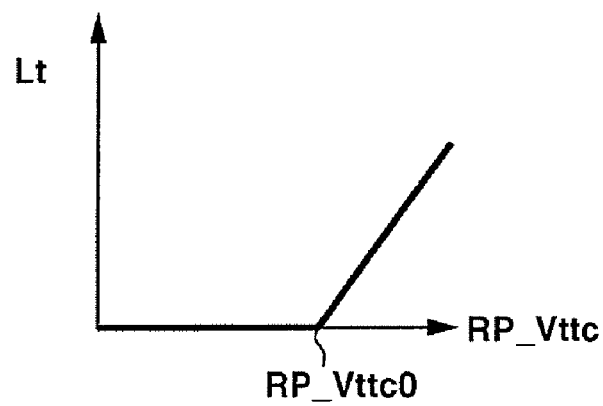
FIG. 44 is a graphical representation of varying of a pedal reaction force control parameter Lt with different values of a risk potential RP_Vttc.

FIG. 44 illustrates varying of the accelerator pedal reaction force control parameter Lt with different values of the first risk potential RP_Vttc. As shown in FIG. 44, the control parameter Lt is zero when the first risk potential RP_Vttc is less than or equal to a predetermined value RP_Vttc0, and it increases as the first risk potential RP_Vttc exceeds the predetermined value RP_Vttc0.

At step S1015, the controller 50B provides, as an output, the control parameter Lt to the accelerator pedal reaction force controlling unit 80. In response to command from the controller 50B, the accelerator pedal reaction force controlling unit 80 drives the servo motor to regulate a reaction force produced via the accelerator pedal.

Figure 45:
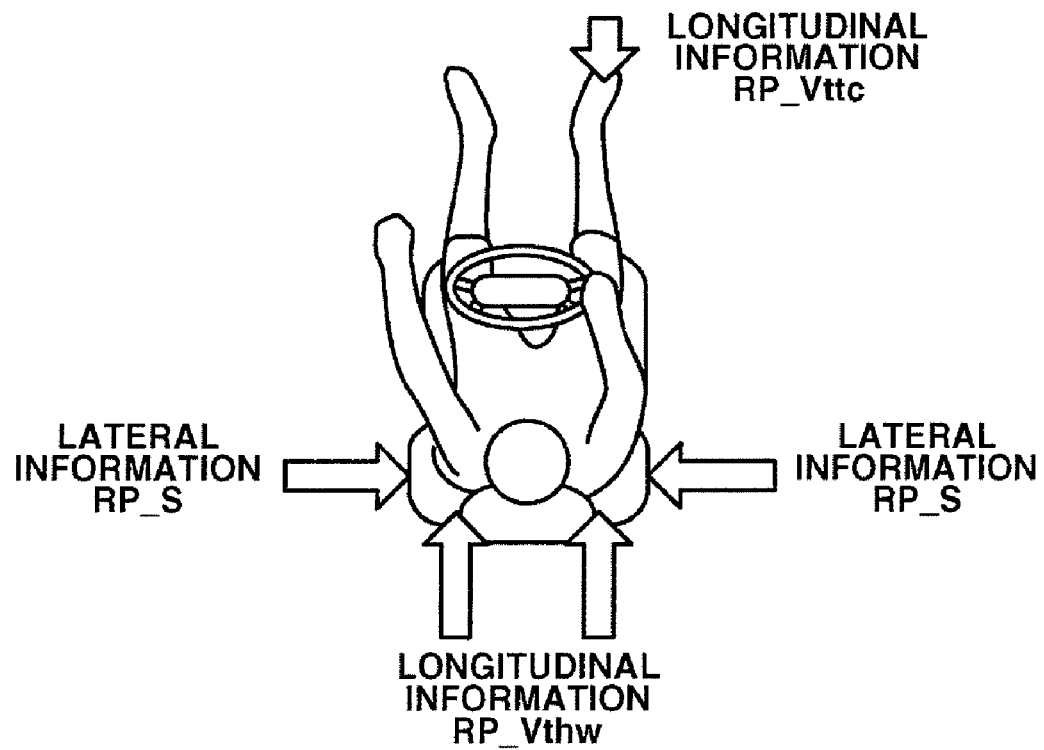
FIG. 45 is a diagram illustrating pieces of information to be transmitted to a driver via a driver's seat and an accelerator pedal.

Referring to FIG. 45, the tenth exemplary embodiment transmits the lateral information in the form of the in-lane lateral position RP_S to the driver by a difference between pressure inputs via the side portions on the right and left 73a and 73b. The tenth exemplary embodiment transmits the longitudinal information in the form of the second risk potential RP_Vthw to the driver by pressure inputs to hold the driver via the side portions on the right and left 73a and 73b. Besides, the tenth exemplary embodiment transmits the longitudinal information in the form of the first risk potential RP_Vttc to the driver by a reaction force input via the accelerator pedal when the first risk potential RP_Vttc exceeds the predetermined value RP_Vttc0.

In addition to the effects provided by the fifth exemplary embodiment, the tenth exemplary embodiment provides an effect as follows:

The driver assisting system 3 is provided with the accelerator pedal reaction force controlling unit 80. With regard to the preceding vehicle, two risk potentials are calculated. A second risk potential, which indicates a stable risk, RP_Vthw and the in-lane lateral position RP_S are transmitted to the driver by different, in magnitude, pressure inputs via the same portion of the seat. A first risk potential, which indicates a transient risk, RP_Vttc is transmitted to the driver by a reaction force input via an accelerator pedal. Separating portions via which different pieces of information are transmitted makes it easy for the driver to clearly and separately recognize pieces of information. Because the risk potential is transmitted to the driver by the reaction force input via the accelerator pedal, the driver will quickly recognize that deceleration operation is imminent.

In the above-described tenth exemplary embodiment, the second risk potential RP_Vthw is transmitted to the driver by pressure inputs to hold the driver via side portions on the right and left 73a and 73b. However, the present invention is not limited to this example. It is possible to transmit the second risk potential RP_Vthw by a pressure or vibration input via a front right area within the cushion portion of the seat or via a middle portion 73c between side portions o the right and left 73a and 73b.

Eleventh Exemplary Embodiment

Referring to FIGS. 21-22 and 46-50, the eleventh exemplary embodiment is described. The eleventh exemplary embodiment is substantially the same as the fifth exemplary embodiment shown in FIG. 21. Like reference numerals are used to designate like parts, portions and steps throughout FIGS. 21-22 and 46-50.

However, the eleventh exemplary embodiment is different from the fifth exemplary embodiment in that, in addition to the right- and left side actuators 710 and 720 of the seat driver mechanism 70A (see FIG. 21), a seat driver mechanism 71B in the seventh exemplary embodiment is provided with a cushion front portion actuator 740 as shown in FIG. 30. This actuator 740 regulates pressure within an air bag embedded into a cushion portion 72 at a front right area supporting the rear of femoral region of a right leg of a driver to produce a pressure input to the driver.

According to the eleventh exemplary embodiment, a risk potential RP_V is calculated with regard to the preceding vehicle as the longitudinal information to be transmitted to the driver. An in-lane lateral position RP_S is calculated as the lateral information to be transmitted to the driver. Further, a lateral risk potential RP_U is calculated with regard to obstacles located within regions on the lateral sides of the host vehicle as the lateral information.

The eleventh exemplary embodiment transmits the risk potential RP_V with regard to the preceding vehicle to the driver by a pressure input via the front right area of the cushion portion 72 supporting the rear of femoral region of the right leg of the driver (see FIG. 30).

The eleventh exemplary embodiment transmits the in-lane lateral position RP_S to the driver by a pressure input via one of side portions on the right and left 73a and 73b of a back rest 73 (see FIG. 30).

The eleventh exemplary embodiment transmits the lateral risk potential RP_U to the driver by a vibration input via one of the side portions on the right and left 73a and 73b of the back rest 73 (see FIG. 30). The lateral risk RP_U is a collision risk between the host vehicle and each of obstacles, such as, a guard rail and a vehicle traveling on the adjacent lane.

Figure 46:
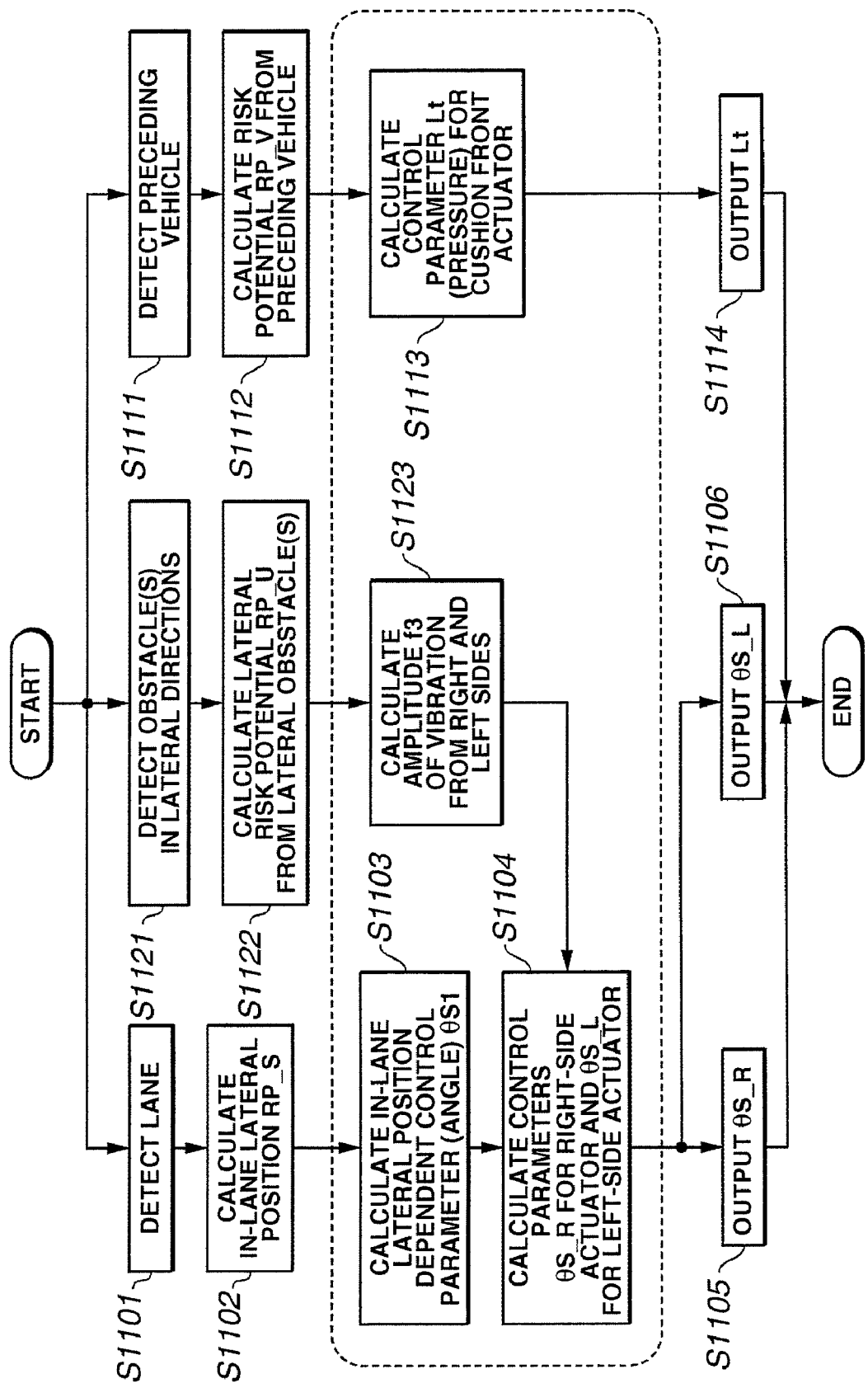
FIG. 46 is a flow chart illustrating the operation of an eleventh exemplary embodiment.

Referring to FIG. 46, it is described below how the eleventh exemplary embodiment operates. The flow chart in FIG. 46 illustrates a control program for assisting the driver. Execution of the control program is repeated at regular intervals of 50 milliseconds. The flow chart in FIG. 46 is substantially the same as the flow chart in FIG. 23. The flow chart in FIG. 46 contains steps S1101, S1102, S1103, S1111 and S1112 which are substantially the same as steps S501, S502, S503, S511 and S512, respectively, of the flow chart in FIG. 23. Description on these steps is hereby omitted.

Figure 47:
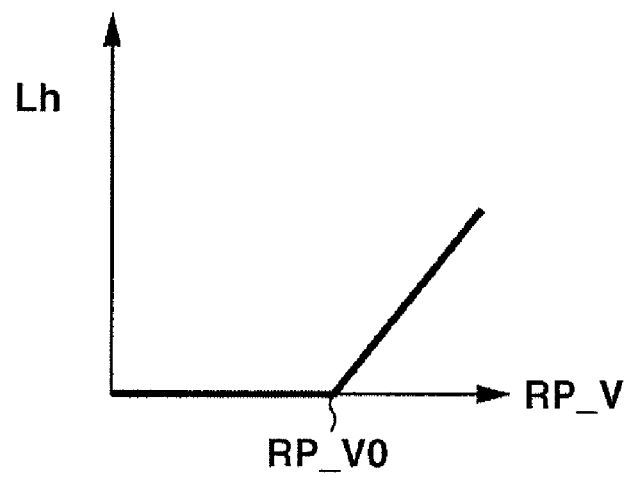
FIG. 47 is a graphical representation of varying of a cushion front portion control parameter Lh with different values of a risk potential RP_V.

In FIG. 46, at step S1113, a controller 50A calculates a control parameter Lh (pressure within the air bag) for the cushion front portion actuator 740 based on the risk potential RP_V calculated at step S1112 with regard to the preceding vehicle. FIG. 47 illustrates varying of the control parameter Lh with different values of the risk potential RP_V with regard to the preceding vehicle. As shown in FIG. 47, the control parameter Lh is zero when the risk potential RP_V is less than or equal to a predetermined value RP_V0, and it increases when the risk potential RP_V exceeds the predetermined value RP_V0.

At step S1121, the controller 50A detects obstacles, such as, a vehicle in rear, a vehicle on the right or left and a guard rail, located within lateral regions of the host vehicle after image processing image data picked up by a right rear view camera and a left rear view camera. At step S1122, the controller 50A calculates a lateral risk potential RP_U between the host vehicle and each of such obstacles.

A lateral risk potential RP_U is given by the reciprocal of a distance between the host vehicle and each of a vehicle on the right or left and a guard rail on the right or left. A lateral risk potential RP_U is given by the sum of an appropriately weighted reciprocal of TTC with regard to a vehicle approaching from the rear and an appropriately weighted reciprocal of THW with regard to the vehicle. If there exist a vehicle on the right or left and a vehicle approaching from the rear, a lateral risk potential RP_U with regard to the vehicle on the right or left and a lateral risk potential RP_U with regard to the vehicle approaching from the rear are added to each other to give a combined lateral risk potential RP_U. The combined risk potential RP_U is used as a lateral risk potential used as an output of the step S1122. The lateral risk potential has a positive sign if the obstacle is located on the right, and it has a negative sign of the obstacle is located on the left.

Figure 48:
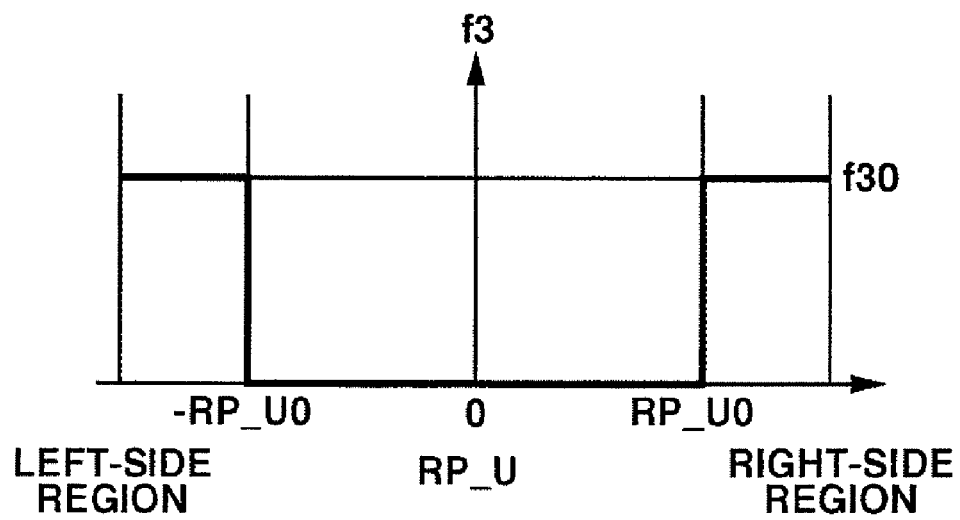
FIG. 48 is a graphical representation of varying of a vibration parameter (amplitude of vibration) f3 with different values of a lateral risk potential RP_U.

At step S1123, the controller 50A calculates a vibration parameter in the form of an amplitude f3 of vibration to be applied to the driver via one of the side portions on the right and left 73a and 73b. FIG. 48 illustrates varying of the amplitude f3 of vibration with different values of the lateral risk potential RP_U. As shown in FIG. 48, the amplitude f3 is zero when the lateral risk potential RP_U falls in a predetermined range |RP_U0| and it is fixed to a predetermined value of f30 when the amplitude f3 exceeds this predetermined range |RP_U0|.

At step S1104, the controller 50A calculates a control parameter θS_R for the right-side actuator 710 and a control parameter θS_L for the left-side actuator 720 using the control parameter θS1 calculated at step S1103 based on the in-lane lateral position RP_S and the vibration parameter (amplitude) f3 calculated at step S1123 based on the lateral risk potential RP_U.

Figure 49:
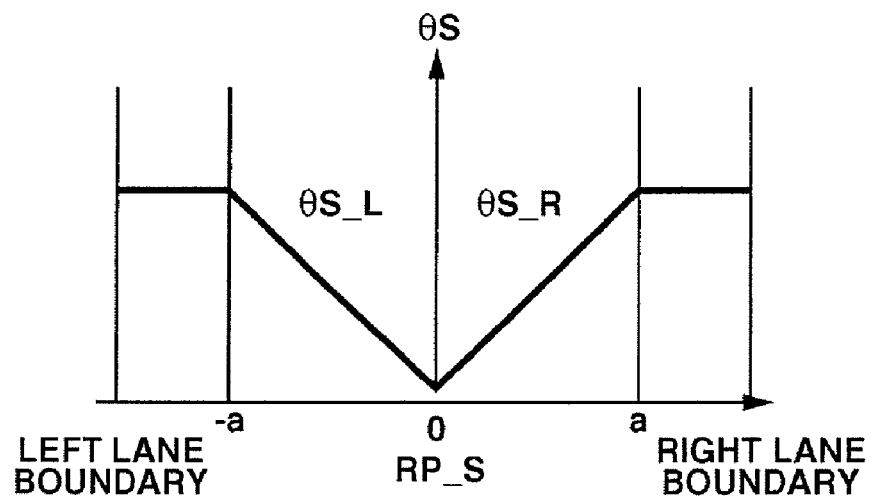
FIG. 49 is a graphical representation of varying of a control parameter θS1 and a control parameter θS2 with different values of an in-lane lateral position RP_S.
Figure 50:
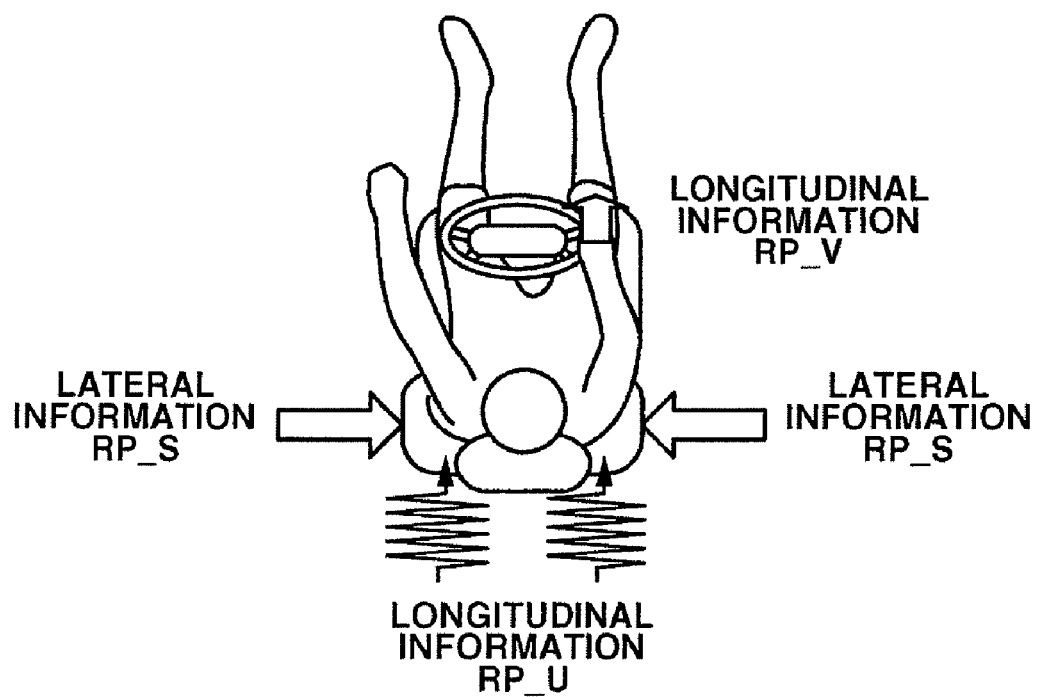
FIG. 50 is a diagram illustrating pieces of information to be transmitted to a driver via a driver's seat.

If the vehicle is traveling on one half of the lane on the right (RP_S≧0), the control parameters θS_R and θS_L are given by one of the following two equations. The fully drawn line in FIG. 49 illustrates varying of the control parameter θS_R and θS_L with different values of the in-lane lateral position RP_S.

If the lateral risk potential RP_U exceeds a predetermined value RP_U0, then $$\theta S\_R = \theta S1 + f3$$

$$\theta S\_L = 0 \qquad \text{(Eq. 25)}$$

If the lateral risk potential RP_U falls below a predetermined value—RP_U0, then $$\theta S\_R = \theta S1$$

$$\theta S\_L = f3 \qquad \text{(Eq. 26)}$$

If the vehicle is traveling on the other half of the lane on the left (RP_S<0), the control parameters θS_R and θS_L are given one of the following equations.

If the lateral risk potential RP_U falls below the predetermined value—RP_U0, then $$\theta S\_R = 0$$

$$\theta S\_L = \theta S1 + f3 \qquad \text{(Eq. 27)}$$

If the lateral risk potential RP_U exceeds the predetermined value RP_U, then $$\theta S\_R = f3$$

$$\theta S\_L = \theta S1 \qquad \text{(Eq. 28)}$$

From the above equations, it is now understood that, in response to the in-lane lateral position RP_S, a pressure input is produced via one of the side portions on the right and left 73a and 73b. In addition to the pressure input, one of the side portions on the right and left 73a and 73b is vibrated in response to the lateral risk potential RP_U. However, no vibration is produced when the lateral risk potential RP_U satisfies the relationship—RP_U0≦RP_U≦RP_U0 because the amplitude f3 is zero (see FIG. 48).

At step S1105, the controller 50A provides, as an output, the control parameter θS_R, calculated at step S1104, to the right-side actuator 710. At step S1106, the controller 50A provides, as an output, the control parameter θS_L, calculated at step S1104, to the left-side actuator 720. At step S1114, the controller 50A provides, as an output, the control parameter Lh calculated at step S1113, to the cushion front portion actuator 740. In response to commands from the controller 50A, the right- and left-side actuators 710 and 720 move the right and left side frames 712 and 722 in rotational directions, respectively, to transmit the lateral information by a pressure input and a vibration input via the side portions 73a and 73b on the right and left. In response to command from the controller 50A, the cushion front portion actuator 740 regulates pressure within the air bag to transmit the longitudinal information by a pressure input via the front right area within the cushion portion 72, Referring to FIG. 50, the eleventh exemplary embodiment transmits the longitudinal information in the form of a risk potential RP_V with regard to the preceding vehicle to the rear of femoral region of the right leg of the driver by a pressure input via the front right area within the cushion portion 72 (see FIG. 10). The eleventh exemplary embodiment transmits the lateral information in the form of the in-lane lateral position RP_S to the driver by a pressure input via one of side portions on the right and left 73a and 73b near a lane boundary which the vehicle is approaching. The eleventh exemplary embodiment transmits the lateral information in the form of the lateral risk potential RP_U to the driver by a vibration input via one of the side portions on the right and left 73a and 73b.

In addition to the effects provided by the fifth exemplary embodiment, the eleventh exemplary embodiment provides an effect as follows:

The controller 50A detects a lateral risk potential RP_U with regard to obstacle located laterally of the vehicle in addition to the in-lane lateral position RP_S. The lateral risk potential RP_U and the in-lane lateral position RP_S are transmitted by vibration and pressure inputs via the side portions on the right and left 73a and 73b. The longitudinal risk potential RP_V and the in-lane lateral position RP_S are transmitted to the driver by different pressure inputs via different portions of the seat. This makes it easy for the driver to clearly and separately recognize pieces of information.

In the seventh exemplary embodiment, a pressure input may be produced via a front left area also in addition to a front right area within the cushion portion of the seat. Lifting the legs by the pressure input is found to be effective to let the driver recognize strongly the actual running conditions.

In the sixth exemplary embodiment, a middle portion control parameter L_S may increase as the risk potential RP_V increases from zero. An accelerator pedal reaction control parameter Lt may increase as the first risk potential RP_Vttc increases from zero.

In the fifth to eleventh exemplary embodiments, the reciprocal of TTC or THW may be used to give the risk potential TP_V with regard to the preceding vehicle.

Although the invention has been shown and described with respect to the exemplary implementations, it is obvious that equivalent alterations and modifications will occur to those skilled in the art upon reading and understanding of the specification. The present invention includes all such equivalent alterations and modifications, and is limited only by the scope of the claims.

What is claimed is:

1. A system for assisting a driver within a vehicle traveling on a road, the system comprising:
   a front view camera configured to pick up image of the road ahead of the vehicle;
   a vehicle speed sensor configured to detect a vehicle speed of the vehicle;
   a navigation system configured to detect a current position of the vehicle and provide information regarding the road;
   a driver seat mounted to the vehicle, the driver seat including a cushion and a back rest that includes a right side portion, a left side portion and a middle portion between the right and left side portions;
   a seat driver mechanism including a right-side actuator for the right side portion of the back rest and a left-side actuator for the left side portion of the back rest;
   a controller including a lane marker detecting section that processes the image, picked up by the front view camera, of the road ahead of the vehicle to detect lane boundaries defining a lane on which the vehicle is traveling, and an in-lane lateral position calculating section that calculates an in-lane lateral position of the vehicle within the lane, the in-lane lateral position of the vehicle indicating a relative lateral position of the vehicle to a centerline of the lane,
   the controller also including a standard speed calculating section that calculates a standard vehicle speed for the road on which the vehicle is traveling based on the information provided by the navigation system, and an excess vehicle speed calculating section that calculates an excess vehicle speed by which the vehicle speed of the vehicle exceeds the standard vehicle speed, the controller further including a seat motion control parameter calculating section that calculates control parameters based on the in-lane lateral position and the excess vehicle speed and provides the control parameters to the seat driver mechanism;

the seat driver mechanism being operative in response to the control parameters to cause the right-side actuator to press the right side portion of the back rest against the driver occupying the driver seat when the in-lane lateral position indicates that the vehicle is deviated from the centerline toward the lane boundary on the right-hand side of the lane, the seat driver mechanism being operative in response to the control parameters to cause the left-side actuator to press the left side portion of the back rest against the driver occupying the driver seat when the in-lane lateral position indicates that the vehicle is deviated from the centerline toward the lane marker which defines the lane boundary on the left-hand side of the lane.

2. The system as claimed in claim 1, wherein, when the in-lane lateral position indicates that the vehicle is deviated from the centerline toward the lane boundary on the right-hand side of the lane, the right-side actuator presses the right side portion of the back rest against the driver in response to the amount of deviation from the centerline toward the lane marker which defines the lane boundary on the right-hand side of the lane and the excess vehicle speed, and wherein, when the in-lane lateral position indicates that the vehicle is deviated from the centerline toward the lane marker which defines the lane boundary on the left-hand side of the lane, the left-side actuator presses the left side portion of the back rest against the driver in response to the amount of deviation from the centerline toward the lane marker which defines the lane boundary on the left-hand side of the lane and the excess vehicle speed.

3. The system as claimed in claim 1, wherein the seat driver mechanism includes a middle actuator for the middle portion of the back rest, and the seat driver mechanism is operative in response to the control parameters to cause the middle actuator to press the middle portion of the back rest against the driver occupying the driver seat based on the excess vehicle speed.

4. The system as claimed in claim 1, wherein the seat driver mechanism includes a cushion front portion actuator for a front portion of the cushion of the driver seat, and the seat driver mechanism is operative to cause the cushion front portion actuator to press the front portion of the cushion against rear of femoral regions of the driver occupying the driver seat based on the excess vehicle speed.

5. The system as claimed in claim 4, wherein the right-side actuator presses the right side portion of the back rest against the driver and the left-side actuator presses the left side portion of the back rest against the driver to hold the driver from right-hand and left-hand sides thereof in response to the excess vehicle speed.

6. The system as claimed in claim 1, wherein the right-side actuator presses the right side portion of the back rest against the driver and the left-side actuator presses the left side portion of the back rest against the driver to hold the driver from right-hand and left-hand sides thereof in response to the excess vehicle speed.

7. A system for assisting a driver within a vehicle traveling on a road, the system comprising:

a front view camera configured to pick up image of the road ahead of the vehicle;

a vehicle speed sensor configured to detect a vehicle speed of the vehicle;

a laser radar mounted to a front portion of the vehicle and configured to provide a distance to a preceding vehicle and a relative speed to the preceding vehicle;

a driver seat mounted to the vehicle, the driver seat including a cushion and a back rest that includes a right side portion, a left side portion and a middle portion between the right and left side portions;

a seat driver mechanism including a right-side actuator for the right side portion of the back rest and a left-side actuator for the left side portion of the back rest;

a controller including a lane marker detecting section that processes the image, picked up by the front view camera, of the road ahead of the vehicle to detect lane boundaries defining a lane on which the vehicle is traveling, and an in-lane lateral position calculating section that calculates an in-lane lateral position of the vehicle within the lane, the in-lane lateral position of the vehicle indicating a relative lateral position of the vehicle to a centerline of the lane, the controller also including a preceding vehicle detecting section that detects the preceding vehicle in front of the vehicle based on the image picked up by the front view camera and output signals from the laser radar, and a risk potential calculating section that calculates a risk potential associated with the preceding vehicle detected at the preceding vehicle detecting section, the controller further including a seat motion control parameter calculating section that calculates control parameters based on the in-lane lateral position and the risk potential and provides the control parameters to the seat driver mechanism;

the seat driver mechanism being operative in response to the control parameters to cause the right-side actuator to press the right side portion of the back rest against the driver occupying the driver seat when the in-lane lateral position indicates that the vehicle is deviated from the centerline toward the lane boundary on the right-hand side of the lane, the seat driver mechanism being operative in response to the control parameters to cause the left-side actuator to press the left side portion of the back rest against the driver occupying the driver seat when the in-lane lateral position indicates that the vehicle is deviated from the centerline toward the lane marker which defines the lane boundary on the left-hand side of the lane.

8. The system as claimed in claim 7, wherein the right-side actuator presses the right side portion of the back rest against the driver and the left-side actuator presses the left side portion of the back rest against the driver to hold the driver from right-hand and left-hand sides thereof in response to the risk potential.

9. The system as claimed in claim 7, wherein the right-side actuator and the left-side actuator produce vibrations via the right and left side portions of the back rest in response to the risk potential.

10. The system as claimed in claim 7, wherein the seat driver mechanism includes a cushion front portion actuator for a front portion of the cushion of the driver seat, and the seat driver mechanism is operative to cause the cushion front portion actuator to produce vibration via the front portion of the cushion against rear of femoral regions of the driver occupying the driver seat based on the risk potential.

11. The system as claimed in claim 10, further comprising a right rear view camera mounted to the vehicle and a left rear view camera mounted to the vehicle, and wherein the controller detects obstacles located within lateral regions of the vehicle after processing images picked up by the right and left rear view cameras and the controller calculates a lateral risk potential associated with each of the detected obstacles, and wherein the controller calculates a vibration parameter in the form of amplitude of vibration based on the lateral risk potential.

12. The system as claimed in claim 11, wherein, when the in-lane lateral position indicates that the vehicle is deviated from the centerline toward the lane boundary on the right-hand side of the lane, the right-side actuator presses the right side portion of the back rest against the driver in response to the amount of deviation from the centerline toward the lane marker which defines the lane boundary on the right-hand side of the lane, the right-side actuator produces vibration via the right side portion of the back rest in response to the vibration parameter when the lateral risk potential exceeds a predetermined value, and the left-side actuator produces vibration via the left side portion of the back rest in response to the vibration parameter when the lateral risk potential falls below the predetermined value, and wherein, when the in-lane lateral position indicates that the vehicle is deviated from the centerline toward the lane marker which defines the lane boundary on the left-hand side of the lane, the left-side actuator presses the left side portion of the back rest against the driver in response to the amount of deviation from the centerline toward the lane marker which defines the lane boundary on the left-hand side of the lane, the left-side actuator produces vibration via the left side portion of the back rest in response to the vibration parameter when the lateral risk potential exceeds a predetermined value, and the right-side actuator produces vibration via the right side portion of the back rest in response to the vibration parameter when the lateral risk potential falls below the predetermined value.

13. The system as claimed in claim 7, wherein the seat driver mechanism includes a middle actuator for the middle portion of the back rest, and the seat driver mechanism is operative in response to the control parameters to cause the middle actuator to press the middle portion of the back rest against the driver occupying the driver seat based on the risk potential.

14. The system as claimed in claim 7, wherein the seat driver mechanism includes a middle actuator for the middle portion of the back rest, and the seat driver mechanism is operative in response to the control parameters to cause the middle actuator to produce vibration via the middle portion of the back rest against the driver occupying the driver seat based on the risk potential.

15. The system as claimed in claim 7 wherein, when the in-lane lateral position indicates that the vehicle is deviated from the centerline toward the lane boundary on the right-hand side of the lane, the right-side actuator presses the right side portion of the back rest against the driver in response to the amount of deviation from the centerline toward the lane marker which defines the lane boundary on the right-hand side of the lane and the risk potential, and wherein, when the in-lane lateral position indicates that the vehicle is deviated from the centerline toward the lane marker which defines the lane boundary on the left-hand side of the lane, the left-side actuator presses the left side portion of the back rest against the driver in response to the amount of deviation from the centerline toward the lane marker which defines the lane boundary on the left-hand side of the lane and the risk potential.

16. The system as claimed in claim 15, wherein the controller includes a pedal reaction force calculating section that calculates an accelerator pedal reaction force based on the risk potential and further comprising an accelerator pedal reaction force controlling section that regulates the reaction force via an accelerator pedal of the vehicle.

* * * * *